US008978075B1

(12) United States Patent
Kaiser et al.

(10) Patent No.: US 8,978,075 B1
(45) Date of Patent: Mar. 10, 2015

(54) ASSOCIATING MEDIA USING METADATA AND CONTROLLING MULTIPLE-DEVICE SYNCHRONIZATION AND RENDERING

(71) Applicant: Coincident.tv, Inc., Hillsborough, CA (US)

(72) Inventors: David H. Kaiser, Hillsborough, CA (US); Bruce Schwartz, Hillsborough, CA (US); Alex Kalinin, Cupertino, CA (US)

(73) Assignee: Coincident.tv, Inc., Hillsborough, CA (US)

( * ) Notice: Subject to any disclaimer, the term of this patent is extended or adjusted under 35 U.S.C. 154(b) by 0 days.

(21) Appl. No.: 13/742,341

(22) Filed: Jan. 15, 2013

Related U.S. Application Data

(60) Provisional application No. 61/588,095, filed on Jan. 18, 2012.

(51) Int. Cl.
*H04N 7/16* (2011.01)
*H04N 7/173* (2011.01)
*H04N 5/44* (2011.01)

(52) U.S. Cl.
CPC ....................................... *H04N 5/44* (2013.01)
USPC ................................ 725/62; 725/88; 725/105

(58) Field of Classification Search
USPC .............................................. 725/62, 88, 105
See application file for complete search history.

(56) References Cited

U.S. PATENT DOCUMENTS

| 8,185,448 B1* | 5/2012 | Myslinski ..................... 705/26.1 |
| 2005/0251823 A1* | 11/2005 | Saarikivi ......................... 725/42 |
| 2008/0134256 A1* | 6/2008 | DaCosta ......................... 725/62 |
| 2011/0185036 A1 | 7/2011 | Lanier et al. |

* cited by examiner

*Primary Examiner* — Pankaj Kumar
*Assistant Examiner* — Franklin Andramuno
(74) *Attorney, Agent, or Firm* — Hickman Palermo Truong Becker Bingham Wong LLP

(57) ABSTRACT

A computer-implemented method comprises determining, at a companion device separate from a television, a current time point of a video program playing at the television, wherein the current time point of the video program is a time point currently being displayed at the television; identifying, based on said determination of the current time point of the video program and based on metadata defining a cue point associated with the determined current time point and an operation associated with the cue point, an operation to be performed; performing, at the companion device, the identified operation; wherein the method is performed by one or more computing devices.

24 Claims, 12 Drawing Sheets

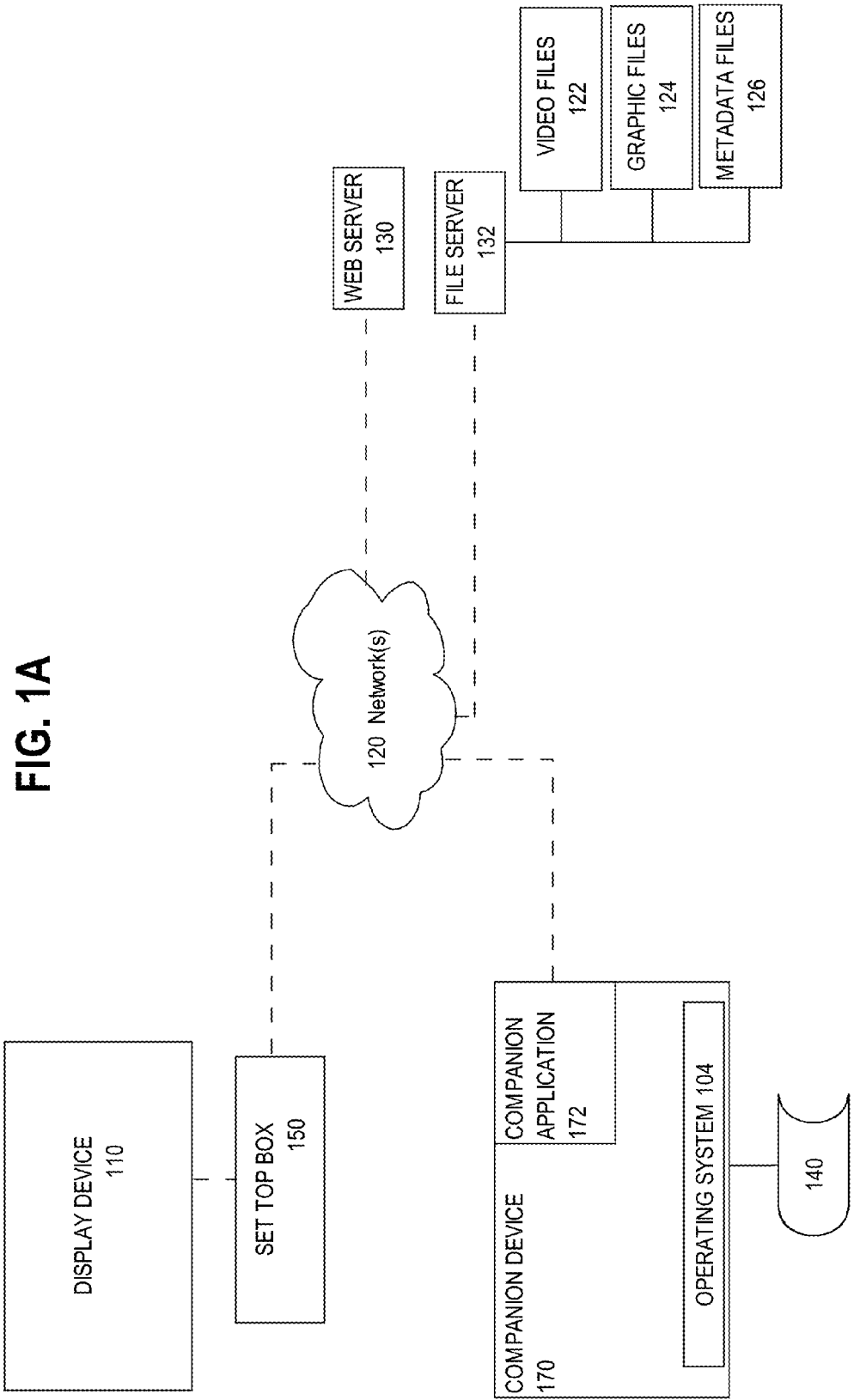

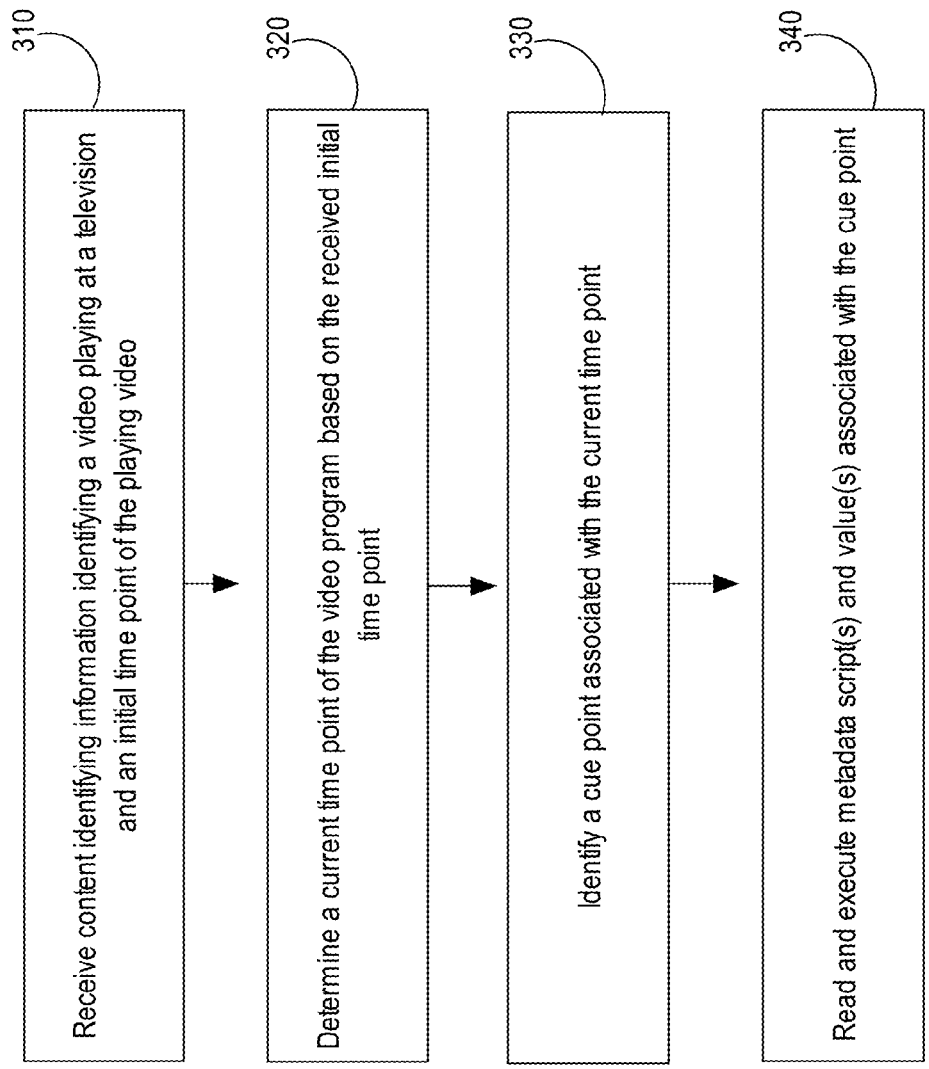

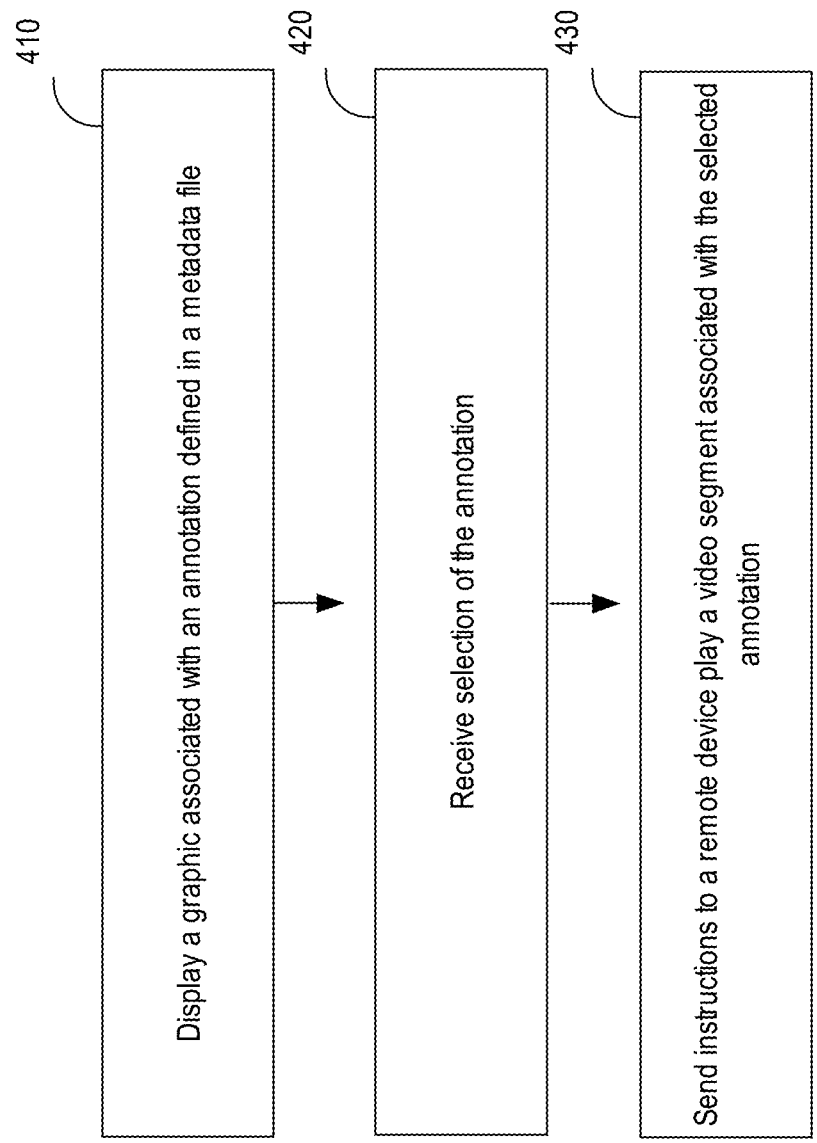

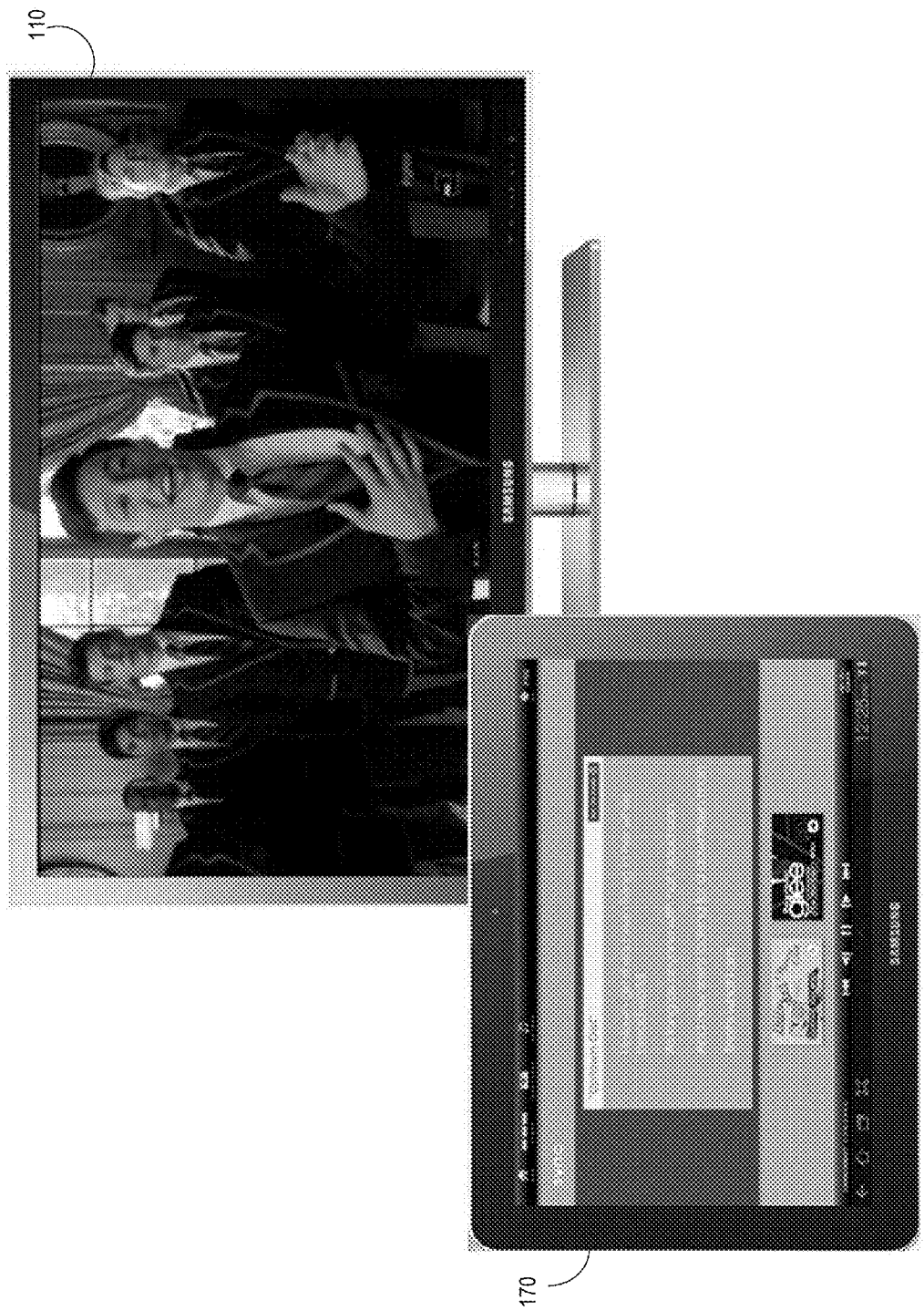

ASSOCIATING MEDIA USING METADATA AND CONTROLLING MULTIPLE-DEVICE SYNCHRONIZATION AND RENDERING

BENEFIT CLAIM

This application claims the benefit under 35 U.S.C. 119 of prior provisional application 61/588,095 filed Jan. 18, 2012, the entire contents of which is hereby incorporated by reference for all purposes as if fully set forth herein.

RELATED APPLICATIONS

Familiarity is assumed with the disclosures set forth in: U.S. provisional patent application 61/177,726, filed May 13, 2009; U.S. provisional patent application 61/321,076, filed Apr. 5, 2010; U.S. patent application Ser. No. 12/779,262, US patent application publication US 2010/0293190 A1, filed May 13, 2010; U.S. provisional patent application 61/426,311, filed Dec. 22, 2010; U.S. provisional patent application 61/549,582, filed Oct. 20, 2011; and U.S. non-provisional application Ser. No. 13/334,802, filed Dec. 22, 2011; the entire contents of which is hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2008-2010 Coincident.TV, Inc.

TECHNICAL FIELD

The present disclosure generally relates to video playing, displaying hyperlinked media, and supplementing video replay with content displayed on a companion device.

BACKGROUND

Commercial television broadcasting has been supported by advertising revenue since its inception. More recently, providers of video programs and video clips in Internet sites have embedded advertising within video programs or next to video programs in web pages at which the video programs are viewed. However, a continuing problem involved in these technologies is that the advertisements are not closely personalized for the viewer. Instead, commercial broadcasters attempt to define, in terms of rough demographic characteristics, a sub-population of a mass audience that is expected to be interested in a particular program; advertisers who believe that their products appeal to the same rough demographic will purchase advertising slots in the program. Unfortunately, a continuing result of this system is that at least some viewers, who do not fit the rough demographic, are shown advertisements that are irrelevant to the viewers' interests.

Internet technologies also have attempted to tailor advertisements, displayed in World Wide Web sites, more closely to the preferences of Internet users, based on collecting explicitly-specified preference data, based on a user profile, or by inferring preferences through collecting metadata that is derived as the Internet user selects pages or performs online actions. However, these technologies are not fully accurate because they rely on algorithms that attempt to match known characteristics of ads with user preferences that can be only roughly inferred from the data that the users provide.

Additionally, viewers find advertisements that interrupt or obstruct the video program being watched as being disruptive, particularly when the advertisements are not of interest to the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1A illustrates an example arrangement of elements that can be used to implement certain embodiments.

FIG. 3 represents an example process for determining when a cue point is reached and executing metadata scripts(s) and value(s) associated with the cue point in multi-screen system.

FIG. 4 represents an example process for sending instructions to a remote device in response to a determined selection of an annotation.

FIG. 5B illustrates another example of a companion device displaying supplemental content synchronously with the display of content on a display device.

FIG. 5C illustrates another example of a companion device displaying supplemental content synchronously with the display of content on a display device.

DETAILED DESCRIPTION

Figure 1B:
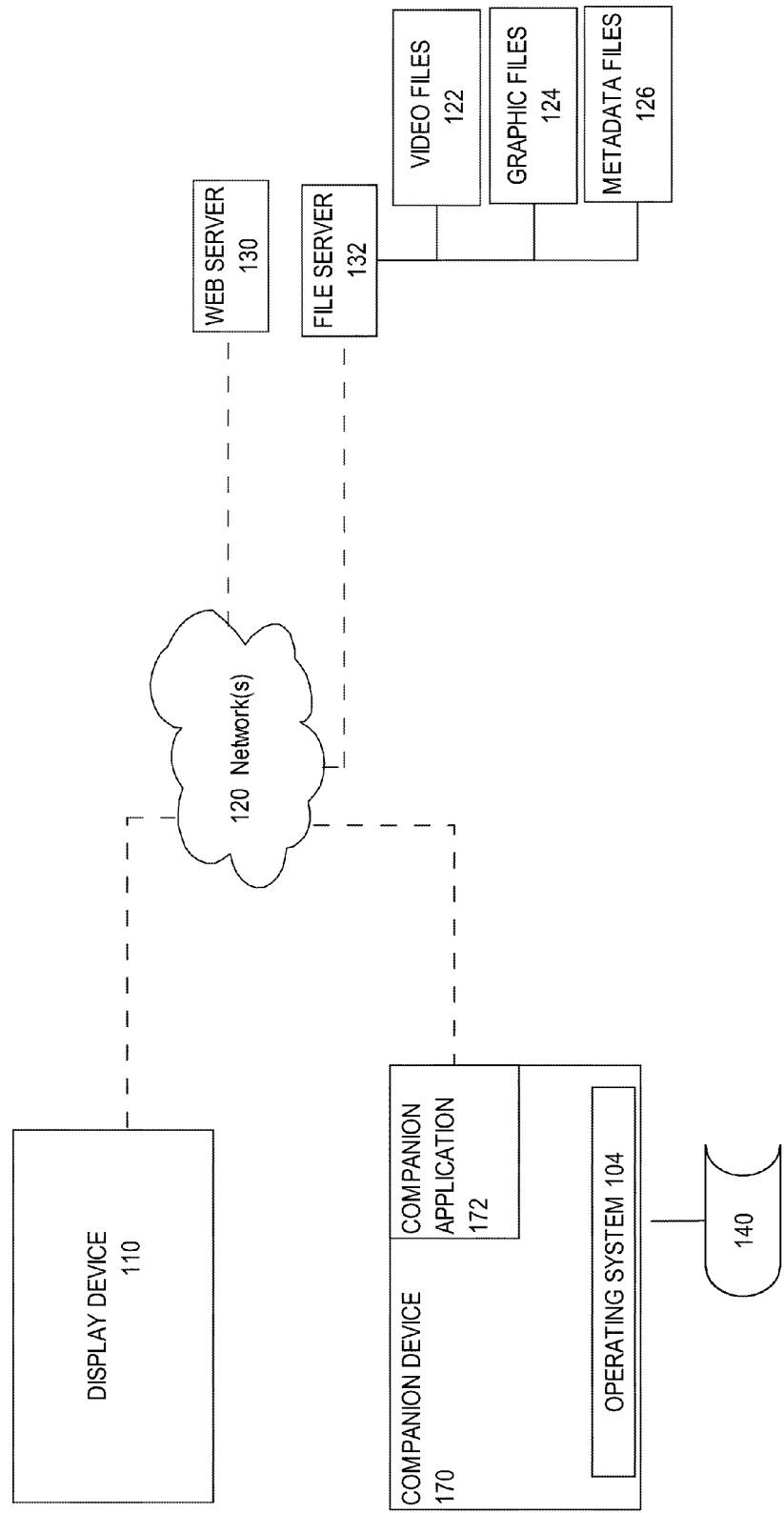
FIG. 1B illustrates an example arrangement of elements that can be used to implement certain embodiments.

APPENDICES. All appendices and other documents filed as part of the above-referenced provisional applications form a part of the disclosure herein. The appendices describe example embodiments and other embodiments may vary from the descriptions in the appendices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline, although the following description does not reproduce, as section headings, each and every item in the outline.

1. Concept summary
2. Overview of structural context
3. Overview of functional context
4. Cue points
5. Video links
  5.1 Editor GUI overview
  5.2 Cue point metadata for particular cue point types
    5.2.1 goto Cue Point
    5.2.2 gotoAutoReturnButton Cue Point
    5.2.3 insertPt Cue Point
    5.2.4 modalStoryBranch Cue Point
    5.2.5 MXMLOverlay Cue Point
    5.2.6 progEnd and return End Cue Points
    5.2.7 webFocus Cue Point
  5.3 Other language elements and attributes; Annotations; Switched Annotations
  5.4 Content types
  5.5 Automatic creation of cue points
  5.6 Directories
  5.7 Web Services
  5.8 Dynamic Layout with Multiple Rectangles
  5.9 Cue Point Language example
6. Playing video and linked media
  6.1 Playing video and linked media using a companion device
  6.2 Companion device examples
  6.3 Companion device and live content
  6.4 Automatic generation of metadata files
7. Implementation details—Hardware overview 1. Concept Summary Various embodiments provide using a companion device in conjunction with a display device upon which a video program is being displayed. The companion device comprises a companion application that interprets metadata. The metadata causes supplemental content to be displayed on a display device associated with the companion device or the companion device itself. The supplemental content may be related to the content being displayed on the display device, and may also be selected based on a user input. The metadata may also cause the display of supplemental content to be strategically synchronized with the content displaying at the display device, such that the supplemental content is likely to be of interest to the user at the particular time that it is displayed. The determination of which content to display may be based on a metadata file specifying cue points in association with time points of video files and/or annotations.

Thus, the supplemental content, whether it is displayed on the companion device or the display device, is likely to be of interest to the user who is watching the content being displayed at the display device. Displaying supplemental content, such as advertisements, on a companion device separate from the display device is also likely to be more visually appealing viewer than supplemental content that occupies the same screen space as the video content being watched.

The metadata interpreted by the companion application may describe one or more display operations, decision operations, branching operations, video linking operations and web media linking operations. In an embodiment, the player implements a method of interpreting the metadata during playback of the video file and performing the operations in coordination with playback. In an embodiment, the metadata format comprises computer-readable data storage media encoded with tags and values which when interpreted cause performing particular display, decision, branching, video linking and web media linking operations. Metadata may comprise cue point type names for various cue point types, and attribute values associated with the cue point types that control the particular behavior of the player in performing the operations.

2. Overview of Structural Context

FIGS. 1A and 1B illustrate an example arrangement of elements that can be used to implement certain embodiments. Display device 110 may be a television, monitor, or other display device. As shown in FIG. 1A, display device 110 may be communicatively coupled to set top box 150. Display device 110 may be connected to set top box 150 through a wire or wirelessly. Set top box 150 may contain a tuner and may be capable of transforming received signals into a signal interpretable by display device 110.

Companion device 170, illustrated in both FIGS. 1A and 1B, may be a tablet computer, mobile computing device or smartphone, personal computer, laptop computer, netbook computer, or other computing device that is typically separate from the display device 110. In an embodiment, companion device 170 is communicatively coupled to set top box 150 through network(s) 120 (as shown in FIG. 1A) or communicatively coupled to display device 110 through network(s) 120 (as shown in FIG. 1B). Video playback at display device 110 may be effectuated by companion device 170 communicating with set top box 150 or display device 110, and set top box 150 or display device 110 communicating with file server 132 or web server 130. File server 132 or web server 130 may comprise one or more video servers containing videos which may be streamed or downloaded. The video content at the video server may be in a format that is only able to be interpreted by set top box 150 or display device 110 or the video server may only be capable of delivering content to set top box 150 or display device 110. In another embodiment, companion device 170 is communicatively coupled to file server 132 or web server 130 through network(s) 120 and video playback at display device 110 is effectuated by companion device 170 communicating directly with file server 132 or web server 130.

Companion device 170 hosts or executes an operating system 104 that supervises I/O, storage management, and execution of application logic. In an embodiment, companion device 170 is coupled to storage 140, which broadly represents any data storage device, storage area network (SAN), network attached storage (NAS), or network file system (NFS) unit or server. Storage 140 may reside on network(s) 120 or on a server coupled to the network. Storage 140 stores video files 122, graphics files 124, and metadata files 126.

Companion device 170 may receive and interpret communications from display device 110, set top box 160, web server 130, or file server 132. Companion application may be software that has been installed on companion device 170. The software may have been downloaded from an external source such as a remote server.

According to various embodiments, companion device 170, display device 110, and/or set top box 150 are coupled directly or indirectly through one or more network(s) 120 to a web server 130 and/or file server 132. Web server 130 hosts one or more video files, HTML documents, HTTP servers or application servers, or other web content. File server 132 stores or hosts video files 122, graphics files 124, and metadata files 126. File server 132 may comprise multiple servers, and one or more of the servers may be a video server containing video files which may be streamed or downloaded onto companion device 170, display device 110, and/or set top box 150. One or more of the video servers may be capable of streaming video files to display device 110 or set top box 150.

Either set top box 150 or display device 110 is capable of requesting or receiving content from web server 130 or file server 132.

Network(s) 120 may comprise multiple independent networks. In various embodiments, network(s) 120 may comprise a local area network (LAN), wide area network (WAN), an internetwork, or a combination.

Companion application 172 is generally configured to open metadata files and to cause video files to be played at display device 110 while interpreting and responding to links and related information and instructions in the associated metadata files. Companion application 172 may initiate communications to set top box 120, display device 110, web server 130, and/or file server 132 which cause the video files to be played at display device 110. Companion application 172 is capable of communicating with set top box 150 or display device 110. Other more specific functions of companion application 172 are described in other sections herein. In some embodiments, the logic of companion application 172 may be partially implemented on server 132 or another server using dynamic AJAX techniques. For example, the server may convert data defining annotations into HTML to be displayed at companion device 170. Alternatively, companion application 172 is implemented as a standalone program application that may be installed locally on companion device 170.

Companion device 170 or companion application 172 may be implemented in various embodiments using a computer, one or more application-specific integrated circuits (ASICs) or other digital electronic logic, one or more computer programs, modules, objects, methods, or other software elements.

3. Overview of Functional Context and Operation

In an embodiment, metadata files are associated with video files, executable instructions and/or descriptive information that are linked to cue points of the video files. A cue point generally comprises an association of a name to a position within a video file, where the position is typically expressed as a time value or timestamp. Companion application 172 may be invoked to play a video and to concurrently detect cue points, identify the previously created metadata information relating to links and operations, and execute the operations. The playback of the video may be at companion device 170 or display device 110. At a cue point, any of several types of operations may be defined to be performed at the time of playback using the. In this document, a cue point of a video file and the operations performed at the cue point are sometimes collectively termed a cue point. Cue points as defined herein can refer to video, coupled video-web contexts or non-temporal web locations (or "web points," as further described).

In an embodiment, cue points enable a user at playback to jump forward and backward in time in a video, and jump between web content and video content. Since the user and the environment can change the order in which media is played, companion application 172 maintains data indicating the user's prior location so that companion application 172 can cause the replay to continue from a prior location.

In an embodiment, web points define an end for web content that specify where to transfer the user when the user has reached the end of a navigation path. Both video and web content can be displayed on the screen at the same time, overlaid over web content or using a picture-in-picture representation, and time can be running or paused. When web content is displayed, selecting a back operation transfers control to a previously viewed page but when the earliest page is reached then a subsequent back operation transfers control away from web content and to the previously viewed video segment. When video is displayed, performing a back operation returns to the beginning of the current video segment.

When the video segment is to be changed, such as by the selection of a back operation, companion device 172 may send instructions to display device 110, set top box 150, or a location from where the content to display would be obtained, such as web server 130 or file server 132. Such instructions would indicate the content that is to be displayed, a time point from which the content should begin replaying, and may also include a location from where the content can be obtained.

Attributes of a web point may include an interest URL, query string, target cue point, web view layout definition, description, and thumbnail graphic image. In an embodiment, interest URL refers to an online electronic document that is loaded and displayed at playback time if the user requests additional information about the data shown at the web point. In an embodiment, a query string that is an attribute of a web point comprises a database query that is submitted to an online engine if the web point is selected, to generate a search result so that the user receives current search result information associated with the web point. A target cue point is a cue point to which the user is directed at playback time after having viewed a web document associated with the web point. A web view layout definition identifies a layout format to be used when displaying web information. The description attribute is a text description of the web point to display, and the thumbnail graphic image is a graphic image displayed to denote the web point. The text or graphic image can be displayed at display device 110 or companion device 170.

The metadata information may be contained in a metadata file that has been downloaded to companion device 170 from an external source, such as file server 132. In an embodiment, companion device 170 implements a method of interpreting the metadata and performing operations based on the metadata file. Companion application 132 may interpret the metadata and performs associated operations based on the metadata information. The interpretation of metadata and performance of operations may happen in coordination with a video playing on a separate display device or on the companion device. In an embodiment, the metadata format comprises computer-readable data storage media encoded with tags and values which when interpreted cause performing particular display, decision, branching, video linking and web media linking operations. Metadata may comprise cue point type names for various cue point types, and attribute values associated with the cue point types that control the particular behavior of companion application 172 in performing the operations. The metadata information may identify an associated video content and contain metadata defining links among segments, link types, and link-related information to support novel playback functions and other user experiences.

In an embodiment, metadata files are associated with some video content and contain executable instructions and/or descriptive information that are linked to cue points of the video content. A metadata file may be received at companion device 170 and be associated with video content playing at display device 110, separate from companion device 170. A cue point generally comprises an association of a name to a time point of the video content, wherein the position is typically expressed as a time value or timestamp. The time value may be expressed as an offset from the beginning of the video content. Any of several types of operations may be defined to be performed at the time the associated time point of the video content is played, i.e. when the cue point is reached. In this document, a cue point and the operations performed at the cue point are sometimes collectively termed a cue point. In an embodiment, a cue point video content plays at display device 110 and one or more of the below-described operations causes content to concurrently be displayed at companion device 170 and/or display device 110.

In an embodiment, any of the following operations may be defined in the metadata for association with a cue point:

Directory or Annotation—a directory or annotation specifies one or more graphics files or text, web services, and associated links; at playback, the graphics files or text are selectable as hyperlinks to cause playback of other video segments and the web services may be invoked automatically to fire database queries, retrieve data, dispatch emails or text messages, or perform other communication functions as defined in the web services.

Jump to a destination—metadata can specify that when a particular cue point is reached during playback, the content should begin replaying at another cue point of the same video content or a different video content. The destination cue point may be earlier in time or later n time than the cue point from which a jump is made. The content may be relayed at display device 110 or companion device 170. Companion application can cause different content to be displayed at display device 110 by sending instructions to display device 110, set top box 150, or an entity from which the content is being received, such as web server 130 or file server 132, depending on the embodiment.

Get more information from a destination—metadata can specify that when a particular cue point is reached during playback, a web page should be displayed or a web application should be invoked. Typically the web site content is associated with or related to the video content at the cue point, but such an association is not required. In an embodiment, the particular cue point is a cue point of a video content that is playing at display device 110 and the displaying of the web page or invocation of the web application occurs at companion device 170 or display device 110.

Change media under external process control—metadata can specify that when a particular cue point is reached during playback, either display device 110 or companion device 170 should switch to one of several pieces of media, as determined by a web service, and continue as specified in the media to which the switch was made.

Modal story branch—metadata can specify that when a particular cue point is reached during playback, either display device 110 or companion device 170 should switch to one of several pieces of media, determined by user selection of an image associated with the media.

Overlay web content—metadata can specify that when a particular cue point is reached during playback, web content should be overlaid upon the video content. This overlay is logically and computationally associated with a web service. The web service maintains databases (both session and persistent) that can be used to influence the course of playback, for example with an insertPt cue point. In an embodiment, asynchronous web services are invoked to control user interaction with the overlaid web components. The asynchronous web services may be invoked by display device 110 or companion device 170.

Display bonus content—metadata can specify that when a particular cue point of a particular video content is reached during playback, particular bonus content should be displayed at a device different than the device at which the particular video content is playing. For example, if the video content is playing at display device 110, the cue point may indicate that a particular video segment, graphic, and/or web content is to be displayed at companion device 170.

Web points may comprise names with associated URLs, graphics and text. These web points can substitute for video cue points. For example, all targets for a user choice cue point can be either video cue points or web points. In this context web points also define an "end" action to be followed in circumstances paralleling reaching the end of a video segment.

In an embodiment, one or more particular cue points may include data defining required associated web pages. Such cue points are termed synchronized attributes or cue point attributes and refer to a specified point in a video that automatically causes particular content to be displayed at the companion device. For example, in an embodiment, any cue point can have an associated web page that is to be displayed while the cue point is active. In this embodiment, when the video segment defined by the cue point is being played and the cue point is reached, the associated web page is automatically loaded and displayed. The size and positioning of the video and web content can also be specified in association with the cue point using the video linking editor logic. With this approach, an author can define a video that provides a synchronized display of an audiovisual work and Internet content such as web pages. The web pages might comprise an advertisement or other online information that is relevant to a particular event on the TV program. For example, an author can set a cue point for a time in the video at which a character appears wearing particular distinctive clothing, and can associate a web page for a merchant of that clothing with the cue point. Consequently, when the video plays and the character appears in the video, the merchant's web page for the associated clothing is automatically accessed and displayed. As an another example, a cue point can associate a time in the video at which an actor appears with a particular web page of the Internet Movie Database (IMDB) service, www.imdb.com, that contains background, filmography and other details for the actor. This approach may be economically attractive both to the broadcaster of the video and the associated web site; for example, the associated web site benefits from an additional page view while the broadcaster concurrently continues to have a viewer viewing the video. More broadly, this approach enables events occurring in temporal media such as video to cause automatic changes in state-based media such as web pages. In an embodiment, the particular cue point is a cue point of a video content that is playing at display device 110 and the display of the associated web page occurs at companion device 170. For example, the associated web page may be automatically loaded and displayed at companion device 170.

Return from the end of segment—metadata can specify that when a particular cue point is reached during playback, a previous segment from which a branch was taken should begin replaying. In an embodiment, web-based cue points define an end, even though web content is a non-temporal media, to specify where to go when the user has reached the end. Both video content and web content can played or viewed on screen at the same time, overlaid or picture-in-picture, and time can be running or paused. In an embodiment, selecting a Back button while viewing web content causes backtracking among hyperlinks in the manner of a web browser, but when no other prior links exist then a selection of a Back operation transfers control to the video segment from which the web content was reached. In content, moving backward in video transfers control to the beginning of the video. In an embodiment, the particular cue point is a cue point of content being displayed or replayed at companion device 170, and particular video content playing at display device 110 is paused. The particular cue point represents the end of the content being displayed at companion device 170, and may specify that when the particular cue point is reached the video at display device 110 is to continue playing.

In an embodiment, companion application 172 interprets metadata such that when the user is watching video, a web link to some form of related content is always available. If the user selects the web link and views the web content, the video is displayed on companion device 170 or in a reduced size picture-in-picture form on display device 110. Further description of the foregoing cue point types is provided in other sections of this disclosure.

Cue point types and the associated metadata values may be stored in metadata files 126. The type and values may be stored in one or more XML script(s) within one of the metadata files 126. However, XML is not required in all embodiments and the metadata files 126 may represent cue point names, types and metadata values in other forms that can be read by companion application 172 and used to control linking, branching, decisions, web interaction, and other content operations when cue points are reached.

Video files may be associated with separate metadata files that specify cue point types and metadata values relating to control functions for the video file, related networked content, and other user interactions. The companion application 172 is configured to play the video and, as each cue point is reached, perform the control functions based on the cue point types and metadata values that are specified in the metadata file.

In an embodiment, companion application 132 comprises logic or program instructions that define what functions are performed for all cue point types, and the metadata files 126 specify cue point types and attribute values that control how the functions are performed, such as specific video displays, graphical displays, user interactions, branches, links or other control functions. In another embodiment, metadata files 126 also comprise the logic or program instructions that define what functions are performed for all cue point types.

The processing of operations or scripts associated with a cue point, may cause the replay of a different video program or a jump in video time points, depending on the cue point type and its associated metadata values. Companion application 172 may be configured to asynchronously process user input requesting trick play functions or loading other video files or metadata files.

Such an approach enables playing a video with a rich set of controls and user interactions including branching to different video segments automatically, presenting a user with a branch selection menu and branching to particular video segments in response to user selection, determining a branch or different video segment using a web service, presenting web content that is related or associated with a video segment, and other controls and user interactions.

4.0 Cue Points

Cue points may be defined independently of the video, and be stored in metadata separate from the video files. For purposes of this document, a "video" is a single piece of video content (a file or a URL) typically with many cue points; within a video each "segment" begins and ends with a cue point without any cue points in between. A "compound segment" or "inLine" segment has cue points within it, i.e., cue points in addition to the beginning and ending cue points. An external video, specified by a URL, may also contain cue points, and depending upon their organization, these cue points may be segments or compound segments. The companion application can refer to internal and external cuePoints transparently.

Cue points have an attribute canBeDestination. If this is set to false, the cue point cannot be a destination of any action which causes the playhead to jump. Cue points with canBeDestination set to false are typically used as markers for overlaying annotations but where the author does not want that point in the video to be a destination for a chapter jump.

In an embodiment, a cue point is a named marker for a particular point in a video segment. A cue points may comprise a name, a time value indicating the particular point, and other metadata that defines what actions occur when that point is reached during playing the video. During playing the video, companion application 172 continuously compares the time value of a current position of a logical playback head within a video segment, and determines if the current time value is equal to any soft cue point that has been previously defined and stored in the metadata file 126 that is associated with the video segment. When a cue point is reached, companion application 172 performs one or more particular operations that are defined in the metadata of the cue point.

An author can select and use video files that are maintained on a third party video server or hosting site, such as YouTube, and streamed from that server or site to an end user at the time of playback. The video files do not need to have cue points previously defined for and stored in them. Instead, the user uses may use a video linking editor logic to create cue points and store the created cue points in the metadata files 126. More details about the video linking editor logic may be found in application Ser. No. 13/334,802, which has been incorporated herein by reference.

The metadata files 126 can be launched and can invoke the companion application 172 to cause the companion application to invoke streaming the video segments from the third party video server or hosting site while concurrently performing one or more operations as cue points are reached in playing the video segments.

In an embodiment, companion application 172 is configured to enable a particular metadata file 126 to reference cue points that are defined in other metadata files 126. In an embodiment, a cue point may comprise a contained element termed a target, which specifies a cue point by name and optionally links it with an association attribute. An attribute of a target may be a cue point reference, which may reference cue points that are in other metadata files. In an embodiment, a cue point reference is formed as a URL comprising a file location (path), file name, and a URL fragment that identifies a particular cue point. For example, the cue point reference "http://www.coincident.tv/cplfiles/foo.cpl#DadArrivesHome" identifies a cue point named "DadArrivesHome" within a metadata file named "foo.cpl" that is stored in the folder or director "cplfiles" of the "coincident.tv" domain. In this embodiment, in any metadata file definition in which a cue point can be a target, for example, as the target of an annotation, insert point, goto cue point, or directory or user choice entry, that target can be in another file referenced by relative URL.

5.0 Video Links

There may be metadata stored describing links between video segments and other contents. In an embodiment, the metadata comprises one or more scripts expressed in a Cue Point Language (CPL). In an embodiment, CPL comprises an XML-based language that describes non-linear structures in a mixture of video and web media. CPL can be embedded into digital video content that is available from a plurality of sources such as broadcast, DVR, DVD, broadband, game consoles. CPL can be associated with web content also. The resulting metadata may be interpreted by companion application 172 to create a playback experience that integrates video and interactive web-based graphic elements in such a manner that the sequence of playback is influenced by user interaction, run-time execution of code embedded in the video, run-time interaction with code referenced by data embedded in the video, and calls to remote web services in combination with jump tables authored in the editor and embedded (or embedded by reference) in the video. In accordance with the stored metadata, a companion application may cause supplemental content to be displayed on a companion device.

The CPL may be viewed as architecture rather than a user interface. For example, while CPL implements a mechanism for a modal n-way branch, the author can use that mechanism to provide a video production that is graceful and easy to use, or confusing and user-hostile. CPL is compatible with a variety of playback platforms, asset locations and video formats. For example, video content can be viewed using screens that are attached to processors, disks or network connections. Platforms may consist of computers, game consoles, set-top boxes, or mobile devices. CPL is format independent with the assumption that all digital video formats define cue points and have ways to associate events and text with the cue point. CPL is location independent and can interoperate with video that originates from any desired source.

Display device 110 may be displaying a non-linear video program in which the viewer arrives at a choice point and selects one of three possible videos; at the end of the selected video, the video project continues with the program. Companion application 172 may cause a display to be presented on companion device 170 which presents the user with an option to select any of the three branches. Based on the user selection, companion application 172 may cause the video segment associated with the selected branch to display on display device 110. Companion application 172 causes the display by sending instructions to display device 110, set top box 150, or a server that comprises the video segment, such as web server 130 or file server 132. The instructions may identify the particular video content to be played, the time point of the content at which to being playing, and/or the location from which the video content is to be retrieved.

5.2 Cue Point Metadata for Particular Cue Types 5.2.1 goto Cue Point

In an embodiment, a "goto" cue point may be defined and at playback, the goto cue point causes a jump to another video segment when the play head reaches the cue point. The destination location for the jump is defined in a cue point group ("cpGroup") and discussed below. In an embodiment, a goto cue point has the following associated metadata:

| | |
|---|---|
| cueType | Goto |
| contentType | "zeroLen" |
| interestURL | Not applicable (NA) as with a zeroLen content type there is no video immediately following the cue point. |
| nameCue | Any string value |
| Query | Not applicable as with a zeroLen content type there is no video immediately following the cue point so having a query to associate with the video is meaningless. |

In an embodiment, a goto cue point has the following elements of interest:

| | |
|---|---|
| cpGroup | a "goto" must have a cpGroup to hold the destination of the goto; cpGroups can hold multiple targets; a goto uses the first target in the cpGroup |
| gotoAutoReturnButton | NA - this contentType = zeroLen meaning that no contiguous video follows, so putting a gotoAutoReturnButton on it doesn't make sense. Besides, it requires a cueType of "goto". |
| mxmlInCPL | NA (The use of MXML for other cue point types is further described below.) |
| progLevelMetadata | If your very first cue point is a goto (at play head time 00:00:00), you'd include the progLevelMetadata here (but it seems like an odd structure to start). See the progLevelMetadata element description for more detail. |
| Story | NA |

An example script code excerpt including a goto cue point, which may be included in a metadata file, is:

<cuePt cueType="goto" interestURL=" " nameCue="goSomeWhere" contentType="zeroLen">
  <cpGroup>
    <targetSeg
      cuePointName="targetThisIsWhereYouGo"></targetSeg>
  </cpGroup>
</cuePt>

5.2.2 gotoAutoReturnButton Cue Point

In an embodiment, a gotoAutoReturnButton cue point supports a mechanism for the user to obtain more information relating to a particular video. From the gotoAutoReturnButton until the next cue point, companion application 172 causes the video being displayed at the display device to be overlaid with a graphical button or causes a graphic to appear on the companion device; user input selecting the button causes the companion application to perform a goto branch operation to reach another cue point with an automatic return. In an automatic return, at the end of the "more information" video segment, the companion application causes the playhead to jump back, reaching the beginning of a video segment that just fallow the end of the calling video segment. For example, a first video segment might comprise a 30-second automobile commercial; 10 seconds into it, the user selects the "more info" button, jumps to a 5-minute extended commercial about the car; and at the end of the extended commercial the companion application jumps back to the programming that followed the original 30 second commercial. The jumping of the playhead may be effectuated by companion application 172 sending instructions to set top box 150, display device 110, or a location from where the content to display is to be obtained, such as web server 130 or file server 132.

In an embodiment, the "gotoAutoReturnButton" cue point comprises the following attributes:

| | |
|---|---|
| cueType | gotoAutoReturnButton |
| contentType | cannot be zeroLen as the button wouldn't appear |
| interestURL | target of the W button (independent of the overlay button) |
| nameCue | Required |
| Query | target of the W button (independent of the overlay button) |

In an embodiment, the following elements are provided:

| | |
|---|---|
| cpGroup | Could be included in order to have a cue point specific directory |
| gotoAutoReturnButton | An overlay button element used to specify the button text and the target, itself a cue point |
| mxmlInCPL | NA |
| progLevelMetadata | If this is the first cue point, it must be a cuePtInitial element and must contain a progLevelMetadata element. |
| Story | A story element is required to cause this cue point (and thus the content that follows it) to be shown in directories (e.g., in an on-screen chapter menu). A story element has descriptive balloon text and a still picture to associate it with a cue point. |

In an embodiment, an example script code segment comprises:
<cuePt
cueType="gotoAutoReturnButton" interestURL="http://www.saabusa.com" nameCue="A" contentType="ad_Inline">
<gotoAutoReturnButton xCueName="C" xLabel="More about Saab!"/>
</cuePt>

5.2.3 insertPt Cue Point

In an embodiment, an insertPt may be used to include one of several pieces of media at a certain point in time. A selection of one of the pieces of media is made by a call to a web service. When reached, the cue point at the end of a target piece of media determines what happens next. The cue point at the end may comprise a returnEnd, goto or progEnd cue point.

In an embodiment, the media consists of one or more video segments with cueType="reg" to begin and a returnEnd, goto or progEnd to end; and one or more web points with cueType="webFocus" to begin and a valid cue point name specified in the gotoWebFocusEndName attribute.

The group of media points is specified as a cpGroup. The cpGroup must have uniform endings for the segments it contains. For example, every cue point identifies a contain segments (or compound segments) and every segment implies an ending cue point. For a cpGroup, all of the ending cue points are either goto cue points, returnEnd cue points, or progEnd cue points, or a mixture of these types of segment ending cue points.

In an embodiment, when the companion application determined that an insertPt has been reached, the companion application invokes the web service specified in the progLevelMetadata element described below with an operation specified with the cpGroup. The result of this call is used to select which media to display (the "target").

For example, assume the user has provided zip code information when registering for NBC.com, and the user is watching an episode of "Saturday Night Live" using the companion device disclosed herein. At an insertPt for a commercial, the companion application calls a web service to obtain the user's zip code. Based on the received zip code value, the companion application selects from among Bronco, Escalade and Hummer commercials. In an embodiment, the cpGroup is stated in script code as:
<cuePt cueType="insertPt" interestURL=" " nameCue="B" contentType="ad_Inline">
　<cpGroup operation="whichAdByZip">
　　<targetSeg association="94010, 94103"
　　　cuePointName="escalade"></targetSeg>
　　<targetSeg association="94611, 94612, 94708"
　　　cuePointName="hummer"></targetSeg>
　　<targetSeg association="94617, 95012, 99234, default"
　　　cuePointName="bronco"></targetSeg>
　</cpGroup>
</cuePt>

In an embodiment, the cpGroup is a table of targets in which an association attribute configured as a string is linked to a media point. The result of the web service call, a string, is tested against the association values until a match is found, and the first match is used. The matching function implements a many-to-one matching as detailed in the cpGroup element description. If no match is found then the association="default" is checked against the table. If there is no match for the string or for "default", then nothing is inserted and the video plays on.

In an embodiment, the end of a video segment is its ending cue point. With cueType="returnEnd," control returns to the calling point. A goto end cue point jumps to wherever specified and a progEnd stops playback. In an embodiment, the end of a cue point with cueType="webFocus" is explicitly specified. It is reached by user action ("back" or goto TV). In an embodiment, the insertPt cue point has the following metadata attributes:

| | |
|---|---|
| cueType | insertPt |
| contentType | Other than zeroLen; see the discussion in the Attributes section of content types. |
| interestURL | Identifies a URL such to which control is transferred upon return from the insertion if "w" button is selected on the computer keyboard. See the discussion of cpGroup-interestURL-query cascade. |
| nameCue | Required. |
| query | Identifies a query that is submitted the interestURL upon return from the insertion if "w" button is selected on the computer keyboard. |

In an embodiment, the cue point has the following elements:

| | |
|---|---|
| cpGroup | A group target elements, with associations(s) and target cuePt(s) specified by name. |
| gotoAutoReturnButton | NA. gotoAutoReturnButton requires cueType = "gotoAutoReturnButton". |
| mxmlInCPL | NA |
| progLevelMetadata | If this is the first cue point, it must be an element of type cuePtInitial and must contain a progLevelMetadata element. |
| Story | See element description. |

An example of script code using an insertPt cue point is:
<cuePt
cueType="insertPt" interestURL=" " nameCue="B" contentType="prog_Inline">
　<cpGroup operation="whoAmI">
　　<targetSeg cuePointName="D"
　　　association="F18to35"></targetSeg>
　　<targetSeg cuePointName="F, default"
　　　association="oldMen">
　</targetSeg>
　</cpGroup>
</cuePt>
Further description on the details of behavior of the modalStoryBranch and insertPt cue points, in an embodiment, is provided in the Appendix.

5.2.4 Modal Story Branch Cue Point

In an embodiment, a modal story branch cue point causes the companion application to pause the video and to present the user with an n-way branch by sending instructions to display device 110, set top box 150, or a location from where the content to display would be obtained, such as web server 130 or file server 132. The user selects an image representing the cue point to go to that cue point. The cue points can be either video or web points. The type for the cue points at the end of the targets are (for video) is goto or progEnd. In an embodiment, the cue point has the following attributes:

| | |
|---|---|
| cueType | modalStoryBranch |
| contentType | Always zeroLen |
| interestURL | NA, at zeroLen |
| nameCue | required |
| Query | NA, at zeroLen |

In an embodiment, the cue point has the following elements:

| | |
|---|---|
| cpGroup | A group target elements, with associations(s) and target cuePt(s) specified by name. Required for a modalStoryBranch. |
| gotoAutoReturnButton | NA |
| mxmlInCPL | NA |
| progLevelMetadata | If this is the first cue point, it must be an element of type cuePtInitial and must contain a progLevelMetadata element. |
| Story | See element description. |

5.2.5 MXML Overlay Cue Point

In an embodiment, an MXML (Macromedia eXtensible Markup Language) overlay cue point allows use of a web development tool to define overlays with web-aware bindings. An example development tool is Flex from Adobe Systems, Inc., San Jose, Calif. Flex provides for content layout and code within an asynchronous architecture. In an embodiment, in the MXMLOverlay cue point MXML code is passed to the companion application via the mxmlInCPL element in the cue point. The code is executed to make the UI element overlays. For example, the companion application is configured to read a MXML user interface markup language script from the metadata file, parse and interpret the MXML script, and generate and display one or more overlay graphical elements at the display device or the companion device based on the parsing and interpreting.

User interaction is processed using a web service that is specified in the progLevelMetadata attribute. User interaction with each component, such as a button, is handled by invoking an operation within the web service named "on" concatenated with the id property of the component. In an embodiment, the operation is called with the data relevant to the component.

In an embodiment, tags that descend from UIComponent and RadioButtonGroup within Flex are used. MXML authoring is further described in Adobe developer network documents relating to Flex. In an embodiment, the cue point has the following attributes:

| | |
|---|---|
| contentType | some non zeroLen type that you want to overlay |
| interestURL | This is where does the "W" button takes you. See the discussion of cpGroup-interestURL-query cascade. |
| nameCue | required |
| query | Where does the "w" button take you? See the discussion of cpGroup-interestURL-query cascade. |

In an embodiment, the cue point has the following elements:

| | |
|---|---|
| cpGroup | This is not an insertPt or a modalStoryBlock so it's not clear that there is a use for a cpGroup here. |
| gotoAutoReturnButton | NA |
| mxmlInCPL | See the description above and the section on the mxmlInCPL element. |
| progLevelMetadata | If this is the first cue point, it must be an element of type cuePtInitial and must contain a progLevelMetadata element. |
| Story | See element description. |

5.2.6 progEnd and Return End Cue Points

In an embodiment, progEnd end returnEnd cue points define the end of a video segment and upon reaching the cue points, the companion application causes the video to stop playing and does not provide a rewind option. There can multiple progEnd's in a media program.

In an embodiment, the returnEnd cue point is used at the end of a segment. Reaching a returnEnd causes a jump to the point that initiated the jump to the start of the segment. In an embodiment, the returnEnd and progEnd cue points have the following attributes:

| | |
|---|---|
| contentType | zeroLen |
| interestURL | NA |
| nameCue | Required |
| query | NA |

In an embodiment, the cue point has the following elements:

| | |
|---|---|
| cpGroup | NA |
| gotoAutoReturnButton | NA |
| mxmlInCPL | NA |
| progLevelMetadata | NA |
| story | NA |

5.2.7 webFocus Cue Point

In an embodiment, a webFocus cue point can specify a URL for a web point and, with a story element, associate an image and text (e.g., for a call out) with the web URL. webFocus cue points can be used as targets in modalStoryBranch cue points and insertPt cue points. webFocus cue points can appear in directories. webFocus cue points can have a gotoWebPointEndName attribute value to specify what to show at the "end" of a webFocus.

In an embodiment, during playback, a user indicates that the user is at the "end" of a webFocus by selecting a "back" browser function or by selecting a "TV" button. If the video media is in an operational state, the companion application switches to the video, maintaining the playhead time and play/pause status. If the video is not in an operational state because, for example, a zeroLen cue point has been reached, the companion application executes a goto to the media point specified by the gotoWebPointEndName.

In an embodiment, the cue point has the following attributes:

| | |
|---|---|
| cueType | webFocus |
| contentType | zeroLen |
| interestURL | The URL that the WebFocus goes to. |
| nameCue | required |
| query | NA |
| gotoWebPointEndName | A cue point to goto at the end of a webFocus. |

In an embodiment, the cue point has the following elements:

| | |
|---|---|
| cpGroup | NA |
| gotoAutoReturnButton | NA |
| mxmlInCPL | NA |
| progLevelMetadata | NA, this element goes in the cuePtInitial which cannot be of type webFocus |
| story | webFocus's generally need stories to be useful |

5.3 Other Language Elements and Attributes

In an embodiment, the cue point language defined herein has the following elements:

cuePt elements have the following attributes:

| Element | Attribute | Comments |
|---|---|---|
| cuePt | nameCue | Any string |
| cuePt | contentType | ad_Inline, ad_Segment, prog_Inline, prog_Segment, zeroLen. See note on contentType(s). |
| cuePt | cueType | reg, gotoAutoReturnButton, progEnd, insertPt, returnEnd, goto, modalStoryBranch, webFocus, MXMLOverlay |
| cuePt | interestURL | a complete, legal URL, including the http:// or similar. This should be, but is not, checked by a regular expression; all the regular expressions for URL's that I found gave many false negatives. |
| cuePt | query | words, no white space, delimited by "+" |
| cuePt | gotoWebPointEndName | a cue point name |

In an embodiment, a cue point has the following contained elements:

| Containing Element | Element | Comments |
|---|---|---|
| cuePt | progLevelMetadata | The first cuePt must be a cuePtInitial and must contain a progLevelMetadata |
| cuePt | cpGroup | optional, at most once; see definition |
| cuePt | gotoAutoReturnButton | optional, at most once; see definition |
| cuePt | story | optional, at most once; see definition |
| cuePt | mxmlInCPL | optional, at most once; see definition |

In an embodiment, a cpGroup is used anywhere a group of cue points is needed. The cpGroups are made up of some attributes and a collection of targetSeg elements. A targetSeg contains a cue point name and an optional association attribute.

Some cue points, for example insertPt, use cpGroups where each cue point in the cpGroup has an association that is used to select the cue points. In operation, the companion application searches the table to match the string provided as a key with the association attribute and then returns the cue point name contained in the first match. Thus, a many-to-one matching is performed. The key may come from a web service as explained in the insertPt cue point section. As an example, with the following targetSeg's in a cpGroup:

| association | cuePointName |
|---|---|
| Jack | A |
| Jill | B |
| John, Jerry, Jill | C |
| June, default | D |

The following matching results would occur:
J, Jack, ack all match A
Jill matches B, and never gets to C
John, Jerry, Jill, ill, Jer, err all match C
ZZZZ (or anything or nothing) matches D (because after looking for the string key, the companion application attempts to match the string "default" as a key.

In an embodiment, the cpGroup has the following attributes:

| Element | Attribute | Comments |
|---|---|---|
| cpGroup | backgroundPicLoc | This image is used as a background image when the cpGroup is used in a display, for example in a modalStoryBlock. |
| cpGroup | headerText | This text is used as the Headline when a cpGroup is used in a display, for example, a modalStoryBlock or a directory. |
| cpGroup | operation | the name of an operation in the web service specified in the progLevelMetadata that is used to select among the target segments |

In an embodiment, the cpGroup has the following contained elements:

| Containing Element | Element | Comments |
|---|---|---|
| cpGroup | targetSeg | One to unbounded number; In a cpGroup it is prudent to have one targetSeg with association= "default". See element definition. |

In an embodiment, a targetSeg may be used to specify a cue point name and optionally associate it with an association attribute. When a group of cue points are needed, e.g., a modalStoryBlock where the user makes the choice, the association attribute can be omitted. In an insertPt the association attribute is needed to determine which cue point to goto. The association attribute can be of the form "aaa, bbb, ccc" where each substring would match the cuePointName. See cpGroup for an explanation of how the association attribute is used to select a cuePointName.

In an embodiment, the targetSeg has the following elements:

| Element | Attribute | Comments |
|---|---|---|
| targetSeg | cuePointName | The cue point name; required. |
| targetSeg | association | A string associated with the target cue point; optional. |

In an embodiment, a mxmlInCPL element may be used to hold executable MXML code. There are no sub-elements and attributes defined. Instead, a user can include anything that descends from the UIComponent in mx:MXML. An example definition is now provided, followed by comments:

1. <mxmlInCPL>
  a. <mx:MXML id="whatever" xmlns:mx="http://www.a-dobe.com/2006/mxml">

1. <mx:Canvas xmlns:mx="http://www.adobe.com/2006/mxml"
   width="600"
   height="440" id="uberContainer">
2. <mx:Button label="button 1" id="button1"
   click="on MXML(event)"/>
3. </mx:Canvas>
b. </mx:MXML>
2. </mxmlInCPL>

| Line | Note |
|---|---|
| 1 and 2 | Enclose the MXML with the mxmlInCPL tag. |
| 1.a | MXML, an element defined by Adobe; you need line 1.a, as it is, but with whatever id you choose. |
| 1.a.1 | Any container (canvas, VBox, etc.) that will contain all the other components. With the fixed name (remember: quick and dirty) "uberContainer". |
| 1.a.2 | Any id you want for the component and then the operation within the web service is "on" + the id. Here you'd build a server side handler with the function name "onbutton1". Any event can be handled (here it is "click") but all components call the fixed name "onMXML" as the handler. |

In an embodiment, a progLevelMetadata element is required. It contains data associated with the overall program. Example attributes include:

| Element | Attribute | Comments |
|---|---|---|
| progLevelMetadata | xUniqueID | This is a unique id for the program. It could be used to retrieve dynamically a set of cue points from the web, updating the entire CPL data and behavior of the program. Currently television programs contain a unique ID as specified by SCTE V-ISAN unique ID that could be used for this purpose. |
| progLevelMetadata | xProgLevelDir | true or false. If true, the companion application will make a directory of all of the cue points (including webFocus's) which have a story element. |
| progLevelMetadata | xVersionCPL | This is a number that specifies the version of CPL used in this file and embedded in the video. The XML will report a validation error if the .xsd file version and this field do not match. The companion application will report an error (but not stop) if the companion application version and the CPL version don't match. |
| progLevelMetadata | xWebServiceLoc | This is the location of the web services used by cue points such as insertPt and MXMLOverlay. The operations within the service are specified separately. The location should match an entry in services-config.xml. |

Example contained elements include:

| Containing Element | Element | Comments |
|---|---|---|
| progLevelMetadata | cuePt | This is where cue points with cueType= "webFocus" are defined. |

In an embodiment, a story element packages data used to display a cue point (web or video). Example attributes include:

| Element | Attribute | Comments |
|---|---|---|
| story | balloonText | A string, used as balloon text in directories, popups, etc. |
| story | picStory | The location of the image to represent the cue point; a jpeg, 100 x 100; see the note regarding path specification for images. |

In an embodiment, a gotoAutoReturnButton element and cue point support a "more info" operation. Example attributes include:

| Element | Attribute | Comments |
|---|---|---|
| gotoAutoReturnButton | xCueName | The target cue, the name of the cue point for the more info. |
| gotoAutoReturnButton | xLabel | The label for the button. |

Annotations

In an embodiment, an annotation element is used to display a graphic on the screen of the display device or the companion device. The graphic can be actionable. An annotation element is a graphic object that appears on screen starting at a cue point; when the next cue point is processed the annotation is removed (although it could be reapplied). It is used to overlay the display with a graphic while in video view and may optionally implement a goto behavior in response to a click. The structure of the annotation element is similar to cuePoints in that it contains the same targetList and story elements. Clicks on an annotation can cause three things to happen, depending on the value of the clickBehavior attribute. See the attribute description. Example attributes include:

| Element | Attribute | Comments |
|---|---|---|
| annotation | name | The type is String. May include white space. Used to identify the annotation. Required. No default. |
| annotation | x, y | The type is Decimal. The position of the annotation; may be relative or absolute. 0,0 is upper left, and the coordinate system |

-continued

| Element | Attribute | Comments |
|---|---|---|
| | | is that of the videoSource attribute in the progLevelMetadata element. Optional. Default is 10, 90 (and "relative" defaults to true). |
| annotation | relative | The type is Boolean. If true interpret the x, y attributes to position the graphic as percentages of video coordinate space; otherwise interpret the values as magnitudes. Optional. Defaults to "true". |
| annotation | alpha | The type is decimal, it is optional and the default value is 1.0. This controls the annotation's transparency with 0.0 being completely invisible and 1.0 being completely occluding. |
| annotation | clickBehavior | The type is string with legal values "goto", "returnEnd", and "decoration". Optional, defaults to "decoration". The behaviors are: clickBehavior = "decoration", a click causes nothing to happen clickBehavior = "goto", execute a goto to the cue point held in the annotation's target clickBehavior = "returnEnd", execute a returnEnd (changing the playhead and stack accordingly) and returns to the segment that caused control to transfer to the segment displaying the annotation. The third case by example: an insertPt has taken the playhead into a segment, the segment has an annotation with clickBehavior = "returnEnd"; a click on the annotation executes a returnEnd and returns the playhead just after the initiating insertPt. |
| annotation | skipOnReturn | Boolean, defaults to "false". This controls the behavior at the end of a target segment (assuming there was one) reached through a user click on an annotation. If true, this causes the playhead to goto the end of the calling segment; otherwise the playhead returns mid-segment to the point within the calling segment from which it was called. |
| Annotation | story | A required image and optional balloon text for the annotation. See the element description. |
| Annotation | targetList | With clickBehavior = "goto" this one element list contains the destination. See description of targetList element description. Meaningless for other clickBehavior values. |

In an embodiment, an audiovisual work may include one or more annotations that specify interactions available to a viewer. Annotations may comprise graphical images, buttons, text messages, labels, and other elements that may be displayed in a variety of locations, for example overlaid on a video segment being displayed at the display device or on the display of the companion device. One or more annotations may be assigned to a cue point; when the cue point is reached during playing, the annotations are activated and remain active until the next cue point. Annotations have flexible attributes relating to where they can be shown, what they can show, and how they behave. Graphic images associated with annotations may include images such as PNG and JPEG files, or SWF files or any other files that can be rendered on the companion device or display device.

In an embodiment, an annotation has one of four types: decoration; goto; returnEnd; and overlay. (Details of annotation types are disclosed in the Appendix.) Annotations may be displayed as static graphical images or animated graphics.

A "goto" annotation may be associated with a target and one of several different kinds of return behavior; a target specifies the time point to which the companion application branches when a viewer clicks on the annotation, and the return behavior specifies where the viewer returns after viewing the video or web page associated with the annotation. For example, the return behavior of a goto annotation may be set to "Skip." With skip on return behavior, after a viewer returns from the annotation's target video segment or web point, the companion application causes the displayed video to skip to the next cue point after the one that includes the goto annotation.

An annotation of any type may be configured with modal behavior. A modal cue point has two different playback modes comprising an initial entry mode and a return or overlay completion mode. When an annotation is modal, each annotation type causes the companion application to operate differently depending upon the then-current mode, as defined by how the cue point was reached. For example, initial entry mode refers to the cue point being reached through normal program flow, or as the result of a direct jump. In initial entry mode, companion application is configured to display all annotations that are configured as modal, pause, and wait for the user to select a non-decoration annotation, such as a "goto" annotation or a "returnEnd" annotation. In contrast, return or overlay completion model occurs when the cue point is returned to via a returnEnd cue point or annotation after a jump from it, or when a viewer selects the Continue button to close an overlay data entry form. (Further details are provided in the Appendix.)

Switched Annotations

In an embodiment, external data may control which annotations or overlays are played back. In various embodiments, external data may be used to control a level of user interactivity with an audiovisual work, or to selectively display annotations such as subtitles in particular foreign languages. In an embodiment, a switched annotation identifier may be used to set up switched annotations and also specify two or more different annotations to display based on the value of an external data item. At playback, an external data value is obtained, and the user experience changes depending on the value of the external data and the particular switching path specified by the switched annotation identifier for that external data value. Thus, the term "switched annotation" refers to the fact that any annotation, as otherwise disclosed herein, may have its visibility on the screen determined by the value of a key in the data store; thus, the annotation can be switched on or off using its associated key.

In an embodiment, a switched annotation may be used to include or display one of several annotations at a certain point in time. A selection of one of the annotations is made by a call to a web service. A switched annotation may be implemented using the techniques described above for the insertPt cue point, except that the switched annotation affects display of annotations, rather than pieces of media. In an embodiment, when the companion application reaches a switched annotation, i.e. determines that the current time point is associated with a switched annotation, the companion application invokes a specified web service with a specified operation. The result of this call is used to select which annotation to display (the "target annotation")

In an embodiment, at a given cue point the properties of a switched annotation are controlled by a key. The key acts as a control variable and can be local to the CTV content, or can be external to the CTV content and reached by, for example, an HTTP request. In an embodiment, at every cue point, and every annotation when clicked, code can potentially execute.

As an example, assume that the key is labeled Language, and can take the value English, French, etc. When an audiovisual work is played, in rendering the annotation, the companion application examines at the key to determine which annotation to show. The author has previously defined an annotation value corresponding to each possible value for the key or key value. For example, the following table associates example Language keys with example annotations:

| Key = Language | Value |
| --- | --- |
| English | "I am here" |
| French | "je suis ici" |

Assume that an audiovisual work is playing and the companion application reaches a particular cue point for which a switched annotation has been defined. As an example, in a screen display, a character is displayed with the subtitle "I am here" in English. The screen display also includes icons, representing annotations, labeled English and French and having highlighting, coloring or other graphical indications that the English icon is enabled and the French icon is disabled. Assume that the user selects the French icon by directing a mouse cursor to it and clicking. In response, the key Language is set to French, and the screen is redrawn so that the subtitle "Je suis ici" appears in place of the English subtitle.

Alternatively, the key may be set by issuing a Web Services request that returns a string value of "English" or "French". In an embodiment, the annotations that are represented by icons for selection of the language are also switched annotations. For example, a first annotation may be labeled FirstLanguage and may receive its value from a Web Services request or from a previously defined table of values.

Switched annotations are defined and operate in a manner similar to the insertPt cue point type that is described elsewhere in this disclosure. However, an insertPt cue point type is used to pick which video segment is inserted at playback at a particular cue point, and a switched annotation is used to select which annotation to use at a particular cue point.

In an embodiment, a switched annotation is implemented by including, in a CTV file or other metadata that defines an annotation, a filter tag. The filter tag has two attributes: key— the name of the variable in the datastore to match against; value—the pattern to match against. The annotation is displayed if the value of the keyword in the datastore is contained within the value attribute string.

For example, if the value in the datastore is "bike", that value match the filter value "bike", "bike,default", and "car, bike" but not "b". As a convenience, if the datastore does not have a value for the given key, the string "default" is used as the value.

In one embodiment, the following syntax is used to define a switched annotation using a filter tag:
   <annotation>
   <filter key=" . . . keyword" value=" . . . match value"/>
   </annotation>
In an embodiment, the audiovisual experience authoring platform described herein is integrated into a social networking platform such as Facebook.

Figure 2:
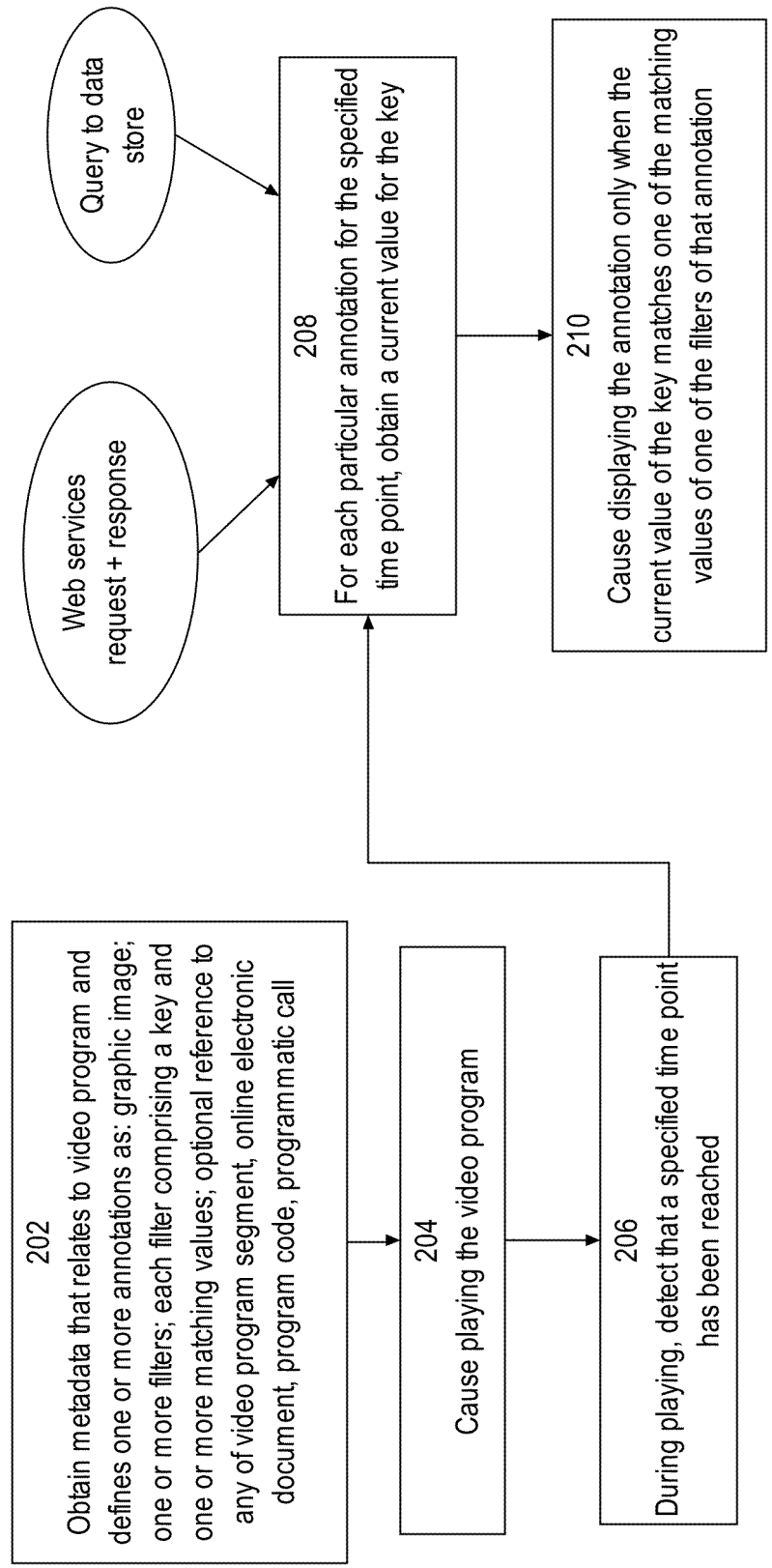
FIG. 2 is a flow diagram illustrating a process for switched annotations.

FIG. 2 is a flow diagram illustrating a process for switched annotations. At block 202, metadata is obtained that relates to a video program and that defines, for a specified time point in the video program, one or more annotations to be invoked at the specified time point. Companion application 172 may select, based on which video program has been determined to be playing at display device 110, a metadata file to obtain. Alternatively, the metadata file being interpreted may have been selected based on a user selection and companion application 172 may cause a particular video program to be displayed at display device 110 based on the metadata being interpreted.

Each of the annotations defined in the metadata file comprises: a graphic image; one or more filters, each of the filters comprising a key and one or more matching values; and optionally a reference to any of: a video program segment, an online electronic document, a set of program code statements, or a programmatic call.

At block 204, display device 110 is caused to play a particular video program. The video program may be streamed or downloaded from web server 130 or file server 132. At block 206, during playing the video program on a computer, the process detects that the video program is playing at the specified time point. At block 208, in response to the detecting, for each particular annotation among the annotations for the specified time point, the process obtains a current value for the key. In various embodiments, obtaining a current value for the key may comprise issuing a query to a database, directory, or other data store. In other embodiments, obtaining the current value of the key comprises issuing a Web Services request and obtaining the current value of the key from a response message that is received in response to the Web Services request. In yet another embodiment, obtaining the current value of the key comprises issuing a Web Services request and determining the current value of the key based on one or more values in a response message that is received in response to the Web Services request.

At block 210, the process causes companion application 172 or display device 110 to display the graphic image associated with that particular annotation only when the current value of the key matches one of the matching values of one of the filters of that particular annotation. When displayed, as with other annotations disclosed herein, the annotation is displayed at either the display device or companion device, at a particular position, size, and with other attributes as otherwise defined in the annotation. Companion application 172 may send instructions to display device 110 or set top box 150 that cause particular graphics to be displayed at display device 110 or overlaid onto content being displayed at display device 110.

Using the techniques herein, a video program played on display device 110 may be supplemented with graphics, links, references to code, or programmatic calls that are selectively displayed based on the value of a stored key. In this manner, annotations to the video program may be switched on and off to yield a variety of graphical experiences and provide for a dynamic, changing video experience that can respond to user input and implement many useful services.

5.4 Content Types

A content type value associated in metadata with a cue point causes differentiated operation of companion application at 172 the time of playback. In particular, the content type zeroLen is treated differently than all others (ad_Inline, segment_Inline, prog_Inline, prog_Segment). For example, ad_Inline and ad_Segment are used to skip advertising content coming back from an insertPt.

5.5 Automatic Creation of Cue Points

In an embodiment, a computer program can create one or more cue points and store the cue points in a metadata file, rather than a user obtaining cue points from encoded video, or the user creating the cue point. In an embodiment, cue points can be added, updated or completely replaced dynamically using web applications, processes, or other computers that are coupled to companion device 170. For example, the unique identifier of a television program, as specified by Society of Cable Telecommunications Engineers, could be used in an update message providing new cut points.

In another example, one or more computer programs can access video and other content databases and use the information gather to generate interactive video experiences based on the cue point language schema that is defined herein. As one example, a Perl script may be configured to access YouTube metadata APIs to construct an interactive video experience based on playing all video matching a particular keyword. In this example, the script may be configured to issue an HTTP-based query to a YouTube server, in which the query conforms to YouTube's APIs, to retrieve a list of all stored videos that include a particular keyword in the metadata maintained by YouTube for the stored videos. In response, the YouTube server sends a responsive dataset. The script may be configured to identify a URL for each video on the YouTube servers that is identified in the responsive dataset, and to write a metadata file 126 that specifies an audiovisual program consisting of a concatenation of all the matching videos. The script could be configured to automatically generate a plurality of annotations, in which each annotation graphically represents a first frame of a different one of the matching videos. In this manner, at playback the user would see a visual menu of each matching video and could activate any desired video by selecting on the image associated with an annotation for one of the videos.

In another example, a program is configured to receive a user query for a particular keyword or phrase and to search a database of movie metadata for matches to the user query. For each match to the user query, an associated database record is selected and retrieved. From each database record, the program retrieves a URL of a video that is stored in third party hosted storage, such as YouTube. The program creates and stores a metadata file 126 that plays the matching videos. For example, the program could be configured to receive a user query to find all video clips in which a character says "Bond, James Bond", assuming such phrases are represented in the database of movie metadata.

In another example, a computer program may be configured to create multiple metadata files 126 based on a single video. For example, a Perl script may be configured to generate multiple versions metadata files 126 for a single video in which each metadata file 126 comprises definitions of annotations for subtitle data in a different language, and the subtitle data is displayed at playing time using the annotations as the subtitle display widget. Additionally or alternatively, automatic creation of cue points may take user behavior into account to create customized cue points for a particular user based upon what is known about the user's behavior as represented in server-side stored data. User behavior can include information what previous cue points have been selected, the elapsed time between selections, whether certain video segments have been skipped, navigation paths as represented by user selections of different video segments in succession, etc.

Thus, embodiments provide flexible means to use output from a database, coupled to a script or other program, wherein the output is optionally selected based on matching user input or queries, to result in automatically creating and storing one or more metadata files 126 which, when played using the companion application 172, result in displaying enriched interactive videos. While certain examples have stated that the program may cause displaying a concatenation of videos matching a query, concatenation is not required. Instead, a program or script may have any level of complexity and may be configured to write a metadata file consisting of any number of cue points, annotations, or other information based upon the language description that is provided herein. In this approach, metadata may be created dynamically and transmitted to the companion device over a network connection without storing or saving the metadata in file format. Further, the examples provided herein are merely representative and countless other applications are possible.

5.6 Directories

A directory comprises, in one embodiment, a selectable, scrollable column on the right part of the video display that appears at cue point boundaries and for a specified period of time, such as four (4) seconds, in response to a movement of a pointing device.

Companion application 172 attempts to generate and display a cue point specific, non-modal directory on a cue point by cue point basis. The media points (video and web) within the directory are specified as a cpGroup and must contain story elements if they are to appear in the directory. These points can be whatever the author chooses to make them and are an opportunity to guide the user into interesting, tangentially related information. For example, in a news show, when a story about Great Britain is shown the directory could contain the related online encyclopedia entry and several video segments; when the news program shifts to the next story, the cue point specific directory changes.

5.7 Web Services

In one embodiment, web services may be implemented using a ColdFusion web server. In an embodiment, web services are called with two string arguments comprising the called operation or function and the type of service. The web service returns a string with three fields comprising an operation specific field (e.g., "serviced" for MXMLOverlay calls), a result, and the type of service string.

5.8 Dynamic Layout with Multiple Rectangles

In an embodiment, an author may customize the positioning of a video window and a web window within an overall window of a companion device.

In some layouts the video window has a reduced size as compared to a size of the browser window. In some layouts the video window is the same size as the browser window. In some layouts a background is defined that is logically behind or surrounds both the video window and browser window. In some layouts the video window is laterally or longitudinally adjacent to the browser window. In some layouts the video window is offset in a corner of the browser window, or centered. A layout may be linked to a particular cue point.

5.9 Cue Point Language Example

TABLE 1 presents an example of a complete metadata file of the type that can be created and stored as one of the metadata files 126.

TABLE 1

CUE POINT LANGUAGE EXAMPLE

```
<MediaProgram xsi:noNamespaceSchemaLocation="CPL_
v-10_validator.xsd"
   xmlns:xsi="http://www.w3.org/2001/XMLSchema-instance">
   <cuePt nameCue="A" cueType="reg"
      interestURL="" contentType="prog_Inline">
      <progLevelMetadata xProgLevelDir="false" xVersionCPL="-10"
      xUniqueID="123">
      </progLevelMetadata>
   </cuePt>
   <cuePt nameCue="B" cueType="insertPt"
      interestURL="" contentType="prog_Inline">
      <cpGroup>
         <targetSeg
            association="default" cuePointName="D"></targetSeg>
      </cpGroup>
   </cuePt>
   <cuePt nameCue="C" cueType="progEnd"
```

TABLE 1-continued

CUE POINT LANGUAGE EXAMPLE

```
        interestURL="" contentType="zeroLen">
    </cuePt>
    <cuePt nameCue="D" cueType="reg"
        interestURL="" contentType="ad_Segment">
    </cuePt>
    <cuePt nameCue="E" cueType="returnEnd"
        interestURL="" contentType="zeroLen">
    </cuePt>
</MediaProgram>
```

In an embodiment, the base element is MediaProgram and encloses all other elements. The element progLevelMetadata is required and specifies information that applies to the whole MediaProgram. In the sample code above, in the cue point named B, the cueType is "insertPt" which jumps to a cue point (in this case D) while establishing a return point. In B, the target segment is specified within a cpGroup (a cue point group); in this case it has only one target and the association attribute is "default". There is nothing to check and there is only one place to jump. In E, the target segment is a cueType=returnEnd which means it will return to where it came from (rather than goto another target). Further, anytime that no video immediately follows a cue point, the cue point has a contentType="zeroLen" (cue point C is also zeroLen).

TABLE 2 presents an example schema for the Cue Point Language.

TABLE 2

EXAMPLE SCHEMA

```
CPL_v1.0_schema.xsd.xsd
<?xml version="1.0" encoding="UTF-8"?>
<xs:schema xmlns:xs="http://www.w3.org/2001/XMLSchema"
           xmlns:mx="http://www.adobe.com/2006/mxml">
    <xs:import namespace="http://www.adobe.com/2006/mxml">
    </xs:import>
    <xs:element name="MediaProgram">
        <xs:complexType>
            <xs:sequence>
                <xs:element ref="progLevelMetadata" maxOccurs="1" minOccurs="1"/>
                <xs:element ref="cuepoints" maxOccurs="1" minOccurs="0"/>
                <xs:element ref="webPoints" maxOccurs="1" minOccurs="0"/>
                <xs:element ref="annotations" maxOccurs="1" minOccurs="0"/>
                <xs:element ref="layouts" maxOccurs="1" minOccurs="0"/>
            </xs:sequence>
        </xs:complexType>
    </xs:element>
    <xs:element name="progLevelMetadata">
        <xs:complexType>
            <xs:attribute name="xversionCPL" type="xs:string" fixed="1.0.0" use="required"/>
            <xs:attribute name="videoSource" type="wwwReference" use="required"/>
            <xs:attribute name="xwebserviceLoc" type="wwwReference" use="optional"/>
            <xs:attribute name="loggingService" type="wwwReference" use="optional"/>
            <xs:attribute name="skinButtons" type="wwwReference" use="optional"/>
            <xs:attribute name="backgroundHTML" type="wwwReference" use="optional"/>
            <xs:attribute name="videowidth" type="positiveInteger" use="optional"/>
            <xs:attribute name="videoHeight" type="postiveInteger" use="optional"/>
            <xs:attribute name="videoViewLayout" type="cplReference" use="optional"/>
            <xs:attribute name="webViewLayout" type="cplReference" use="optional"/>
        </xs:complexType>
    </xs:element>
    <xs:element name="cuePoints">
        <xs:complexType>
            <xs:sequence>
                <xs:element ref="cuePt" maxOccurs="unbounded" minOccurs="0">
            </xs:sequence>
        </xs:complexType>
    </xs:element>
    <xs:element name="webPoints">
        <!--web point are cue points with the cue type set to webPoint and defined here;
            to use them they go in directoryList and targetList elements
            defined in cue points-->
        <xs:complexType>
            <xs:sequence>
                <xs:element ref="cuePt" maxOccurs="unbounded" minOccurs="0"/>
            </xs:sequence>
        </xs:complexType>
    </xs:element>
    <xs:element name="annotations">
        <!-- this is where to define annotations; to use them
             they go in an annotationList inside a cue point-->
        <xs:complexType>
            <xs:sequence>
                <xs:element ref="annotation" maxOccurs="unbounded"
```

TABLE 2-continued

EXAMPLE SCHEMA

```
minOccurs="0"/>
                    </xs:sequence>
                </xs:complexType>
            </xs:element>
            <xs:element name="layouts">
                <!-- this is where to define layouts; to use them
                    they go in a webpoint or metatadata layout attribute -->
                <xs:complexType>
                    <xs:sequence>
                        <xs:element ref="layout" maxOccurs="unbounded"
minOccurs="0"/>
                    </xs:sequence>
                </xs:complexType>
            </xs:element>
            <xs:element name="cuePt">
                <xs:complexType>
                    <xs:all>
                        <xs:element ref="annotationList" maxOccurs="1"
minOccurs="0"/>
                        <xs:element ref="directoryList" maxOccurs="1"
minOccurs="0"/>
                        <xs:element ref="targetList" maxOccurs="1"
minOccurs="0"/>
                        <xs:element ref="story" maxOccurs="1"
minOccurs="0"/>
                    </xs:all>
                    <xs:attribute name="name" type="xs:string" use="required"/>
                    <xs:attribute name="cueType" type="xcueType"
use="required"/>
                    <xs:attribute name="tags" type="xs:string" use="optional"/>
                    <xs:attribute name="interestURL" type="wwwReference"
use="required"/>
                    <xs:attribute name="query" type="queryForm" use="optional"/>
                    <!-- not for webpoints -->
                    <xs:attribute name="time" type="xs:decimal" use="optional"/>
                    <xs:attribute name="zeroLen" type="xs:boolean"
use="required"/>
                    <xs:attribute name="cannotSkip" type="xs:boolean"
use="optional" default="false"/>
                    <xs:attrIbute name="pauseOnEntry" type="xs:boolean"
use="optional" default="false"/>
                    <xs:attribute name="modalOnEntry" type="xs:boolean"
use="optional" default="false"/>
                    <xs:attribute name="soft" type="xs:boolean" use="optional"
default="true"/>
                    <xs:attribute name="backgroundHTML" type="wwwReference"
use="optional"/>
                    <xs:attribute name="coincidentwebPoint" type="cplReference"
use="optional">
                    <!-- only for webpoints -->
                    <xs:attribute name="pauseOnDisplay" type="xs:boolean"
use="optional" default="false"/>
                    <xs:attribute name="webViewLayout" type="cplReference"
use="optional"/>
                </xs:complexType>
            </xs:element>
            <xs:element name="targetList">
                </xs:complexType>
                    <xs:sequence>
                        <xs:element ref="target" maxOccurs="unbounded"
minOccurs="1"/>
                    <xs:sequence>
                    <xs:attribute name="backgroundPicLoc" type="xs:string"
use="optional"/>
                    <xs:attribute name="headerText" type="xs:string"
use="optional"/>
                    <xs:attribute name="operation" type="xs:string"
use="optional"/>
                <xs:complexType>
            </xs:element>
            <xs:element name="directoryList">
                </xs:complexType>
                    </xs:sequence>
                        <xs:element ref="target" maxOccurs="unbounded"
minOccurs="1"/>
                    </xs:sequence>
                    <xs:attribute name="headerText" type="xs:string"
```

TABLE 2-continued

EXAMPLE SCHEMA

```
use="optional"/>
                </xs:complexType>
        </xs:element>
        <xs:element name="annotationsList">
                <xs:complexType>
                        <xs:sequence>
                                <xs:element ref="target" maxOccurs="unbounded" minOccurs="1"/>
                        </xs:sequence>
                </xs:complexType>
        </xs:element>
        <xs:element name="annotation">
                </xs:complexType>
                        <xs:all>
                                <xs:element ref="target" maxOccurs="1" minOccurs="0"/>
                                <xs:element ref="story" maxOccurs="1" minOccurs="1"/>
                        <xs:all>
                        <xs:attribute name="name" type="xs:string" use="required"/>
                        <xs:attribute name="clickBehavior" type="xClickBehavior" use="required"/>
                        <xs:attribute name="x" type="xs:decimal" use="required"/>
                        <xs:attribute name="y" type="xs:decimal" use="required"/>
                        <xs:attribute name="skipOnReturn" type="xs:boolean" use="optional" default="false"/>
                        <xs:attribute name="showIcon" type=xs:boolean use="optional" default="false"/>
                </xs:complexType>
        </xs:element>
        <xs:element name="layout">
                <xs:complexType>
                        <xs:attribute name="videoHeight" type="xs:string" use="optional"/>
                        <xs:attribute name="videoVCenter" type="xs:string" use="optional"/>
                        <xs:attribute name="videoTop" type="xs:string" use="optional"/>
                        <xs:attribute name="videoBottom" type="xs:string" use="optional"/>
                        <xs:attribute name="videoWidth" type="xs:string" use="optional"/>
                        <xs:attribute name="videoHCenter" type="xs:string" use="optional"/>
                        <xs:attribute name="videoLeft" type="xs:string" use="optional"/>
                        <xs:attribute name="videoRight" type="xs:string" use="optional"/>
                        <xs:attribute name="videoHeight" type="xs:string" use="optional"/>
                        <xs:attribute name="webVCenter" type="xs:string" use="optional"/>
                        <xs:attribute name="webTop" type="xs:string" use="optional"/>
                        <xs:attribute name="webBottom" type="xs:string" use="optional"/>
                        <xs:attribute name="webWidth" type="xs:string" use="optional"/>
                        <xs:attribute name="webHCenter" type="xs:string" use="optional"/>
                        <xs:attribute name="webLeft" type="xs:string" use="optional"/>
                        <xs:attribute name="webRight" type="xs:string" use="optional"/>
                <xs:complexType>
        </xs:element>
        <xs:element name="target">
                <xs:complexType>
                        <xs:attribute name="cuePointRef" type="cplReference" use="required"/>
                        <xs:attribute name="association" type="xs:string" use="optional"/>
                </xs:complexType>
        </xs:element>
        <xs:element name="story">
                <xs:complexType>
                        <xs:attribute name="balloonText" type="xs:string"
```

TABLE 2-continued

EXAMPLE SCHEMA

```
use="optional"/>
                        <xs:attribute name="picLoc" type="xs:string"
use="optional"/>
                        <xs:attribute name="picOverLoc" type="xs:string"
use="optional"/>
            </xs:complexType>
        </xs:element>
        <xs:simpleType name="xCueType">
            <xs:restriction base="xs:string">
                <xs:enumeration value="regular"/>
                <xs:enumeration value="programEnd/>
                <xs:enumeration value="returnEnd"/>
                <xs:enumeration value="goto"/>
                <xs:enumeration value="userChoice"/>
                <xs:enumeration value="webPoint"/>
                <xs:enumeration value="overlay"/>
                <xs:enumeration value="insertPt"/>
            </xs:restriction>
        </xs:simpleType>
        <xs:simpleType name="xClickBehavior">
            <xs:restriction base="xs:string">
                <xs:enumeration value="regular"/>
                <xs:enumeration value="decoration"/>
                <xs:enumeration value="returnEnd"/>
            </xs:restriction>
        </xs:simpleType>
        <xs:simpleType name="queryForm">
            <xs:restriction base="xs:string">
                <xs:pattern value="((\S+) ((\+S+)*))*"/>
            </xs:restriction>
        </xs:simpleType>
        <!-- reference to a www resource, e.g. an image, HTML file, SWF, etc. -->
        <xs:simpleType name="wwwReference">
            <xs:restriction base="xs:string">
            </xs:restriction>
        </xs:simpleType>
        <!-- reference to a CPL entity. e.g. a cue point, web point, annotation, or
layout element -->
        <xs:simpleType name="cplReference">
            <xs:restriction base="xs:string">
            </xs:restriction>
        </xs:simpleType>
</xs:schema>
```

6. Playing Video and Linked Media

6.1 Playing Video and Linked Media Using a Companion Device

Companion device 170 may be used in conjunction with a display device 110 for an enriched multi-screen experience. Companion device 170 may possess sync functionalities, where the companion device displays supplemental content related to the content being displayed on display device 110 in synchronization with content being displayed on display device 110. Companion device 170 may also possess instruction functionalities where the companion device controls the content that is displayed on display device 130.

Companion device 170 may control the content that is displayed on display device 110 by sending instructions to display device 110, set top box 150, or a location from which the content being displayed is being obtained, such as web server 130 or file server 132. Such instructions may be sent in response to determining a cue point has been reached or otherwise.

In an embodiment, companion device 170 interprets a metadata file in synchronization with a video being displayed at display device 110. Companion device 170 determines when cue points are reached during the replay of the video being displayed at display device 110, and causes the operation associated with the cue point to be performed. Companion device 170 may determine when a cue point has been reached in a variety of ways.

FIG. 3 represents an example process for determining when a cue point is reached and executing metadata scripts(s) and value(s) associated with the cue point in multi-screen system. At block 310, content identifying information identifying the video program playing at a television and the time point of the video program currently playing at the time the content identifying information is communicated, e.g. an initial time point, is received. The content identifying information may be received at companion application 172 from set top box 150, display device 110, web server 130, or file server 132.

The content identifying information may be received in response to companion application 172 sending a request for content identifying information to set top box 150 or display device 110. The companion application may also send a request for content identifying information to a location from which the content being display on the display device is obtained, such as to web server 130 or file server 132. The request for content identifying information may be sent in response to a user action, for example a user executing companion application 172.

In other embodiments, content identifying information may be automatically determined. For example, companion device 170 may detect the audio or video of the video being displayed at display device 110 and based on the detected video or audio, companion application 172 may determine the video content being played at display device 110. The content identifying information may also be determined based in part on user input. For example, the user may indicate the channel being watched, video content being watched, and/or the time point of the content. Companion application 172 may supplement the user input with other data such as the current time or program guide data to determine the video content being displayed at display device 110. For example, the user may indicate that the television show Happy Years is playing, and companion application 172 may determine, based on program guide data and the current time that 9 minutes of the television show Happy Years has elapsed, and thus the current time point is 9 minutes from the beginning of the television show. The user may indicate the content or channel being watched by selecting to execute an application that is specific to a set of content, such as an application that is specific to a particular show, channel, or movie.

Display device 110, set top box 150, web server 130, or file server 132 file may also send other messages to companion application 172 that affect the calculation of the current time point, such as a message indicating that the video content time point has been altered, e.g. the video content has been paused, rewound, or fast forwarded. Companion application 172 may add or subtract an amount of time based on the received message when determining the current time point of the video content playing at display device 110.

At block 320, the time point of the content currently playing at display device 110, i.e. the current time point, is determined based on the received initial time point. For example, companion application may receive an initial time point of the video, and the current time point of the video currently playing may be calculated by the adding an elapsed amount of time, e.g. the amount of time which has passed since the content identifying information was received. In another embodiment, companion application 172 sends instructions to set top box 150, display device 110, web server 130, or file server 132 that cause the displaying of video content at a particular time point, i.e. an instructed initial time point. The current time point is determined by adding the amount of elapsed time to the instructed initial time point, where the amount of elapsed time is the amount of time elapsed since the instructions were received.

At block 330, a cue point associated with the current time point is identified. In an embodiment, cue points are defined in a metadata file or an external file in association with a particular time point, and companion application 172 may determine that a cue point has been reached by comparing the determined current time point to the definition of the cue point to determine if a cue point has been defined for the current time point.

At block 340, companion application 172 reads and executes metadata scripts and values associated with the cue point. The execution of the scripts and values effectuates the operation associated with the cue point. The cue point could be associated with a variety of different types of operations as discussed in further detail above.

The associated operation may cause a graphic file or text to be displayed at companion device 170 or display device 110. The graphic files or text may be selectable as hyperlinks to cause playback of other video segments and the web services may be invoked automatically to fire database queries, retrieve data, dispatch emails or text messages, or perform other communication functions as defined in the web services.

The resulting supplemental content may be displayed at either companion device 170 or display device 100. The supplemental content may be video, graphic, text, or web data s and may be retrieved from web server 120 or file server 132. The supplemental content may be information retrieved from a particular destination or the result of an invoked web service.

Companion application 172 may send instructions to set top box 150 or display device 110 to play or display supplemental content at display device 110 and, in response to the received instructions, set top box 150 or display device 110 may send a request for the supplemental content to file server 132 or web server 130. In certain embodiments, companion application 172 sends instructions directly to file server 132 or web server 130, requesting the file serve or web server to deliver the content to display device 110, either directly or indirectly through set top box 150.

The instructions may identify the particular video content to be played, the time point of the content to be played, and/or the location from which the video content is to be retrieved. In an embodiment, the request for content sent to file server 132 or web server 132, conforms to the Real Time Messaging Protocol (RTMP).

A cue point may be associated with operations that cause supplemental content to be displayed at both display device 110 and companion device 170. For example, in response to determining that a cue point has been reached, companion application 172 may cause supplemental content to be displayed at companion device 170 and may also cause a graphic to be overlaid on the video being displayed at display device 110, signifying to the user that the companion device is displaying supplemental content.

The cue point may be associated with an operation that causes a particular portion of video content to be displayed at display device 110. Companion application 172 may cause the target video content to begin playing at companion device 170 or display device 110 by sending instructions to display device 110, set to box 150, file server 132, or web server 130 according to the methods discussed above, which cause the video content to be displayed at display device 110.

The operation associated with a particular cue point may indicate that supplemental content is to be displayed at display device 110 in addition to the video content already being displayed at display device 110. The cue point definition may also indicate how the display of the supplemental content is to be formatted. For example, the supplemental content may be graphics that are to be overlaid upon the video content, or supplemental video content that is to be displayed in a portion of display device 110's screen. The supplemental video may also be played concurrently with the video content already being played on display device 110. In an embodiment, set top box 150 or display device 110 may receive instructions for how the display of the supplemental content is to be formatted. Which indicate a format type such as picture-in-picture format or overlay format where the supplemental content is to be overlaid upon original content. The format instructions may be sent by companion application 172, web server 130, or file server 132, and may be sent along with the supplemental content or may be sent independent of the supplemental content.

The operation associated with a cue point may cause an option for viewing bonus content to be presented to the user. For example, the occurrence of the cue point, i.e. a determination by companion application 172 that a cue point has been reached, causes a selectable option to be presented to the user, either on display device 110 or companion device 170, for viewing an extended version of a commercial. The original video content being displayed at display device 110 may contain an abridged commercial, and there may be a cue point associated with the time point at which the abridged commercial begins. At the time the cue point is reached, the selectable option is presented to the user. Upon the user selecting the selectable option, an extended version of the commercial is displayed at display device 110 companion device 170.

In an embodiment, the extended version is be displayed at companion device 170 and the selection of the option may causes the displaying of the abridged commercial at display device 110 to pause or the remaining portion of the abridged commercial to be skipped.

Companion application 172 may send instructions to display device 110, set top box 150, file server 132, or web server 130 which cause the abridged commercial content to be paused or skipped. For example, if instructions are sent to display device 110 or set top box 150, display device 110 or set top box 150 may request a different portion of video content from file server 132, which occurs later than the portion originally requested. If instructions are sent to file server 132 or web server 130, file server 132 or web server 130 may deliver a different portion of video content to display device 110 or set top box 150, which occurs later than the portion originally being delivered.

FIG. 4 represents an example process for sending instructions to a remote device in response to a determined selection of an annotation. At block 410, a graphic associated with an annotation displayed. The annotation is defined in a metadata file, and the definition identifies the graphic and operation associated with the annotation. The annotation-associated graphic may be displayed at display device 110 or companion device 170. The annotation is associated with an instruction operation, such that when the annotation is selected, e.g. by clicking on the annotation-associated graphic, companion device 170 instructs a remote device to play the video segment associated with the annotation. At block 420, selection of the annotation is received at companion application 172. At block 430, companion application 172 sends instructions to a remote device to play the video segment associated with annotation. The instructions are sent in response to a determination that the annotation was selected and based on a determination that the annotation was associated with an instruction operation. The remote device to which the instructions are sent may vary depending on the embodiment. The instructions may identify the particular video content to be played, the time point of the content at which to being playing, and/or the location from which the video content is to be retrieved. The instruction may be sent to display device 110 or set top box 150. In response to receiving the instructions, display device 110 or set top box 150 may request web server 130 or file server 132 to deliver the particular video content. In another embodiment, companion application 172 may send instructions to web server 130 or file server 132 to deliver the content to display device 110, either directly or indirectly through set top box 150. The instructions may conform to the Real Time Messaging Protocol (RTMP).

Companion device 170 may function as a remote control that controls the content displayed at display device 110. In an embodiment, companion application 172 accesses programming guide data and presents an interactive television guide to the user. Multiple annotation elements are displayed at companion device 170, where each annotation element represents a particular piece of video content that the user may watch at display device 110. Upon the user selecting an annotation, companion device 172 may send instructions to a remote device for displaying the video content. Other user selections may cause other instructions to be sent that cause other changes in the content being displayed at display device 110, such as the forwarding, rewinding, skipping, and changing of content. The remote device may be display device 110, set top box 150, or a location from where the content is received, such as web server 130 or file server 132.

6.2 Companion Device Examples

Figure 5A:
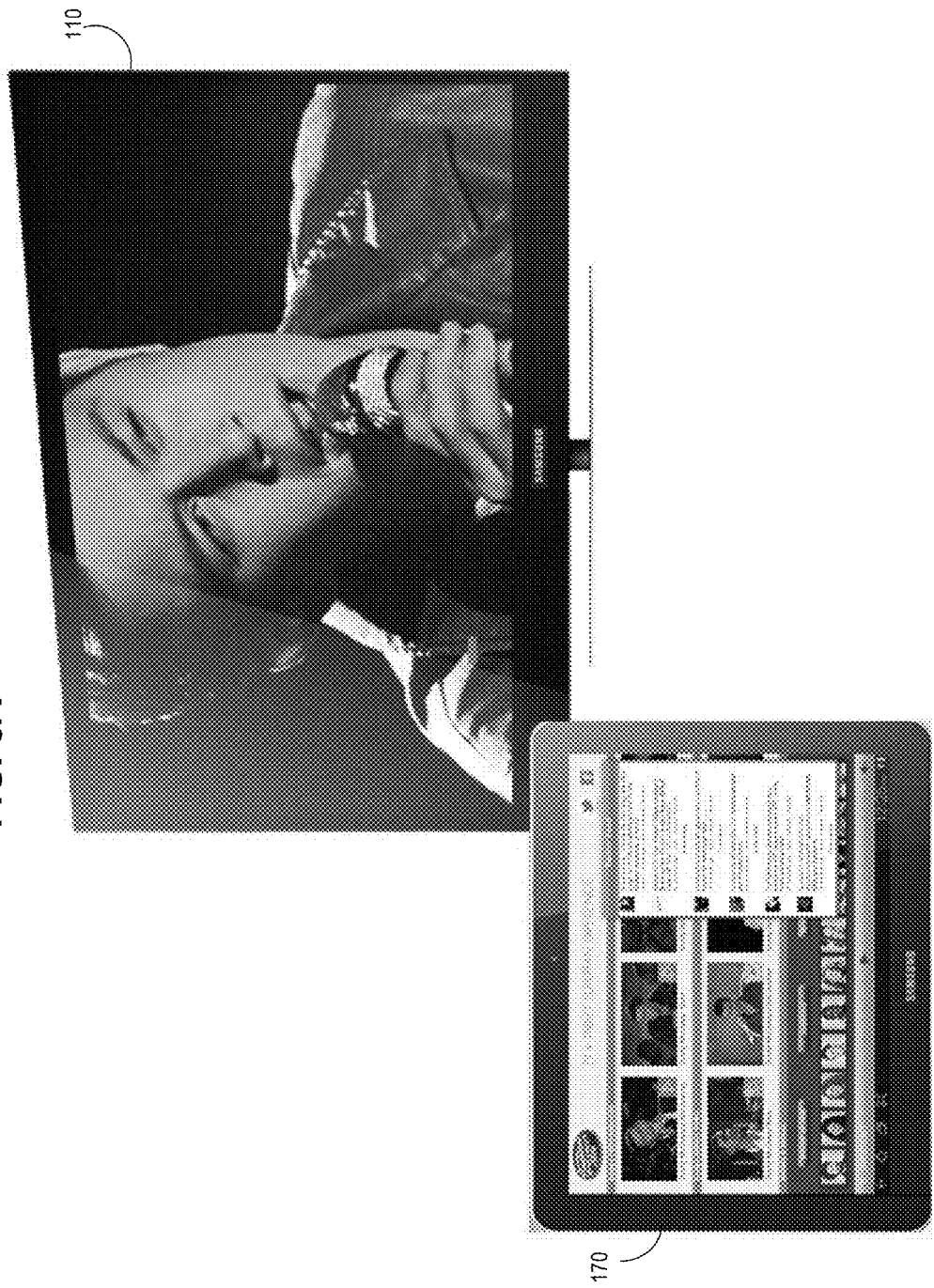
FIG. 5A illustrates an example of a companion device displaying supplemental content synchronously with the display of content on a display device.

FIG. 5A illustrates an example of a companion device displaying supplemental content synchronously with the display of content on a display device. Display device 210 displays video content that may be live or pre-downloaded. Companion device 170 is a tablet computer displaying supplemental content related to the content being displayed at display device 110. As shown in FIG. 5A, companion device 170 displays a compilation of web data retrieved by companion application 172 from one or more different web locations. The web data includes (1) a twitter feed comprising tweets shared by twitter users which have been determined to be related to the content being displayed at display device 110, (2) a set of profile pictures of other users who are determined to be watching the same video content as the content being displayed at display device 110, and (3) a set of supplemental video content which is determined to be related to the content being displayed at display device 110. There may be cue points associated with various time points of the content being displayed at display device 110. One or more of those cue points may have been associated with an operation, which when executed causes the retrieval of web data from specified web locations and the display of retrieved data.

The cue point definition may also indicate how the supplemental data is to be formatted and displayed. For example, the definition may indicate that the graphics representing the twitter data is to be overlaid upon the graphics representing the list of related supplemental video content.

FIG. 5B illustrates another example of a companion device displaying supplemental content synchronously with the display of content on a display device. Display device 110 displays the video content and companion device 170 synchronously displays the lyrics to the song being featured in the video content. As the video content plays, different lines of the lyrics are highlighted in yellow to represent the lyrics currently being sung in the video content. Such a synchronized karaoke display is effectuated by the use of cue points stored in association with various time points of the video content being displayed at display device 110. Based on the particular cue point that has last been reached, the text to be displayed is selected and the particular portion of the text to be highlighted is determined. The determination of which portion of the wording to highlight may be effectuated by the use of switched annotations, which have been discussed in detail above. In response to each new cue point being reached, companion application 172 may cause the value of switched annotation key to change. For example, each of lines 1, 2, 3, and 4 may be associated with separate filter key values, and only one of the lines may be associated with the filter key value "ON" whereas the other three lines are associated with the filter key value "OFF." Companion application 172 may interpret the filter key values and upon determining that the key value is "ON" select a particular graphical image for display which shows the associated text as highlighted.

Display device 170 also displays graphical images representing forward, rewind, pause, forward seek, and backward seek functions at the bottom of the screen. Each of the graphical images may be annotation elements, and upon a user selecting one or more of the annotations by clicking the associated graphical image, companion application 172 may cause the operation associated with the annotation to occur. Each of the associated operation would cause either the content being displayed at display device 110 to change or the time point being played to change. For example, upon determining that the forward annotation was selected, companion application 172 may send instruction to display device 170, a set top box associated with display device 110, or a file server or web server from which the video content is being received. The instructions would cause the video content being displayed at display device 110 to change in accordance with the associated operation.

FIG. 5C illustrates another example of a companion device displaying supplemental content synchronously with the display of content on a display device. Companion device 170 displays a yellow dress available for purchase while the video content being displayed at display device 110 features a character wearing a similar yellow dress. Companion application 172 interprets a metadata file associated with the video content being displayed at display device 110, and determines that a particular cue point has been defined for the time point at which the character in the yellow dress is shown. The cue point definition is associated with an operation that causes an online website to be retrieved and displayed.

Figure 5D:
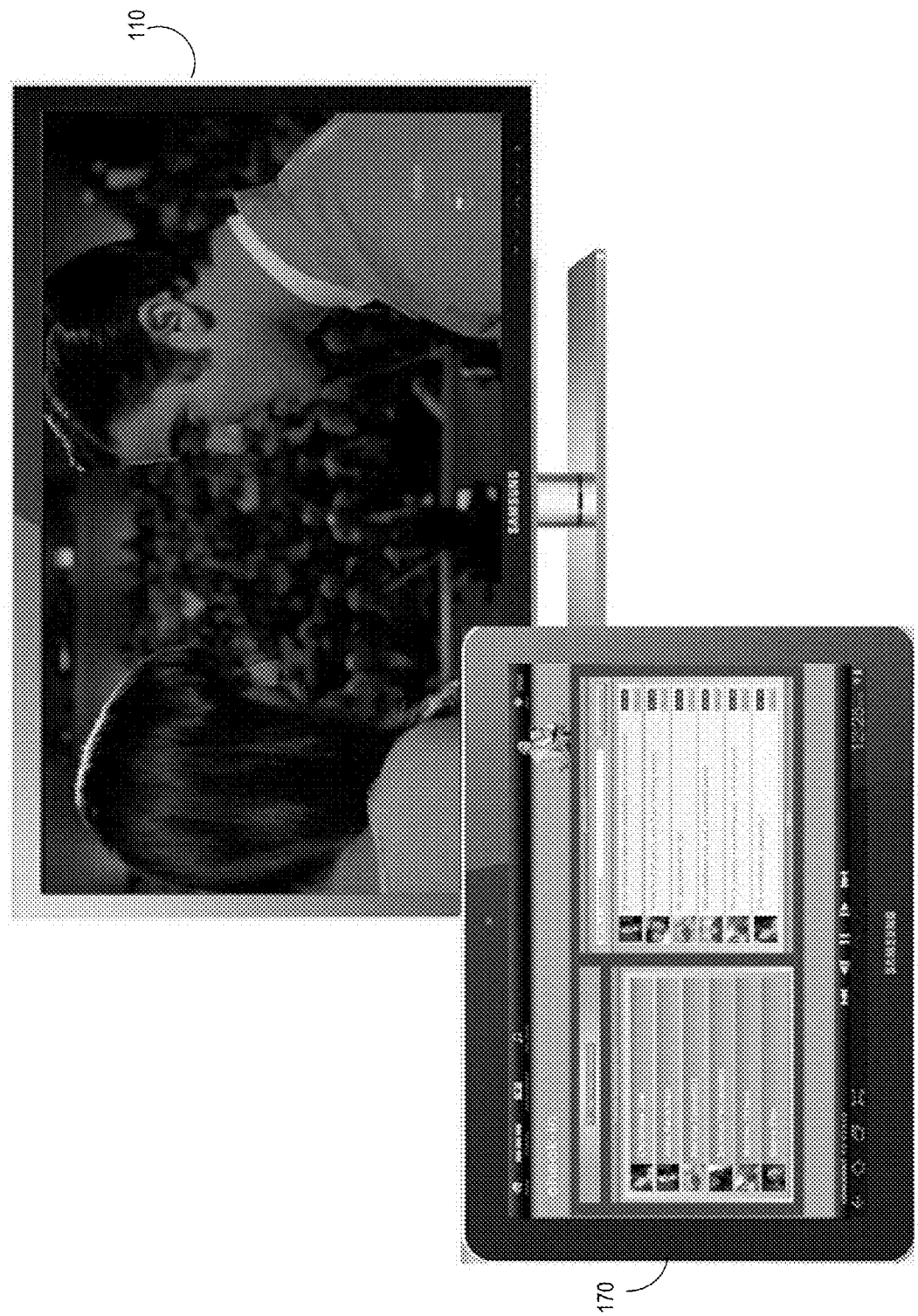
FIG. 5D illustrates another example of a companion device displaying supplemental content synchronously with the display of content on a display device.

FIG. 5D illustrates another example of a companion device displaying supplemental content synchronously with the display of content on a display device. Display device 170 displays a web site where a user may "check in" to the show he is watching, i.e. indicate that he is currently watching the video content being displayed at display device 110. The user may also input comments related to the video content being displayed. In response to the user input indicating a "check in," a particular web server containing "check in" data may be updated. In addition, display device 170 may display supplemental content such as photographs of other users who have "checked in" to the video content currently being displayed, as well as comments that have been entered by those other users. Images representing comments of the user or the user's social networking friends on a particular video may be shown at a point in playback that corresponds to what the user was watching when the comment was posted. Alternately, supplemental content such as the content being displayed on companion device 170 may not be associated with a particular cue point of the video content being displayed; instead the supplemental content may be generally associated with the video content. The illustrated supplemental content may be displayed in response to a determination that the user is watching the particular video content.

6.3 Companion Device and Live Content

In an embodiment, cue points are associated with live content and companion application 172 interprets the metadata file associated with the live content and causes the operations associate with the cue points to occur. The cue points may be associated with operations that cause the live content which is being displayed on display device 110 to pause, rewind, forward, or skip content.

Companion application 172 causes such an operation to occur by sending instructions to display device 110, set top box 150, or the location from where the content is obtained, such as web server 130 or file server 132. The live content may be buffered by set top box 150. Set top box 150 may store some of the obtained live content data for at least some period of time. For example, there may be a cue point associated with a time point of a live football game, and in response to a determination the cue point has been reached, companion application 172 may cause a bonus video to be displayed at display device 110 or companion device 170. The occurrence of the cue point may also cause companion application 172 to send instructions to set top box 150. The instructions may indicate that set top box 150 is to begin buffering the live content being obtained from a remote location, such as from web server 130 or file server 132, and is to pause the display of live content at display device 110. When the bonus content has concluded replaying, companion application 172 may then instruct set top box 150 to resume playing the buffered live content. The instructions may also indicate a time point from which buffered live content is to resume. The set top box 150 may then cause the buffered content to be displayed at display device 110. Set top box 150 may cause the buffered live content to resume being displayed at display device 110 from the time point at which the cue point associated with the bonus operation occurred or another specified cue point.

Metadata files associated with the content displaying on display device 110 may be updated while the content is being displayed on the display device. An entity at file server 132, or some other location from where the metadata files are retrieved, may notify companion application 172 when updates are available or may send the updates as soon as they are available. For example, an operator may create updates to a metadata file associated with live content as the live content is being streamed. The updates may be saved at a file server and sent to companion application 172, where the updates are to be interpreted.

6.4 Automatic Generation of Metadata Files

Figure 6:
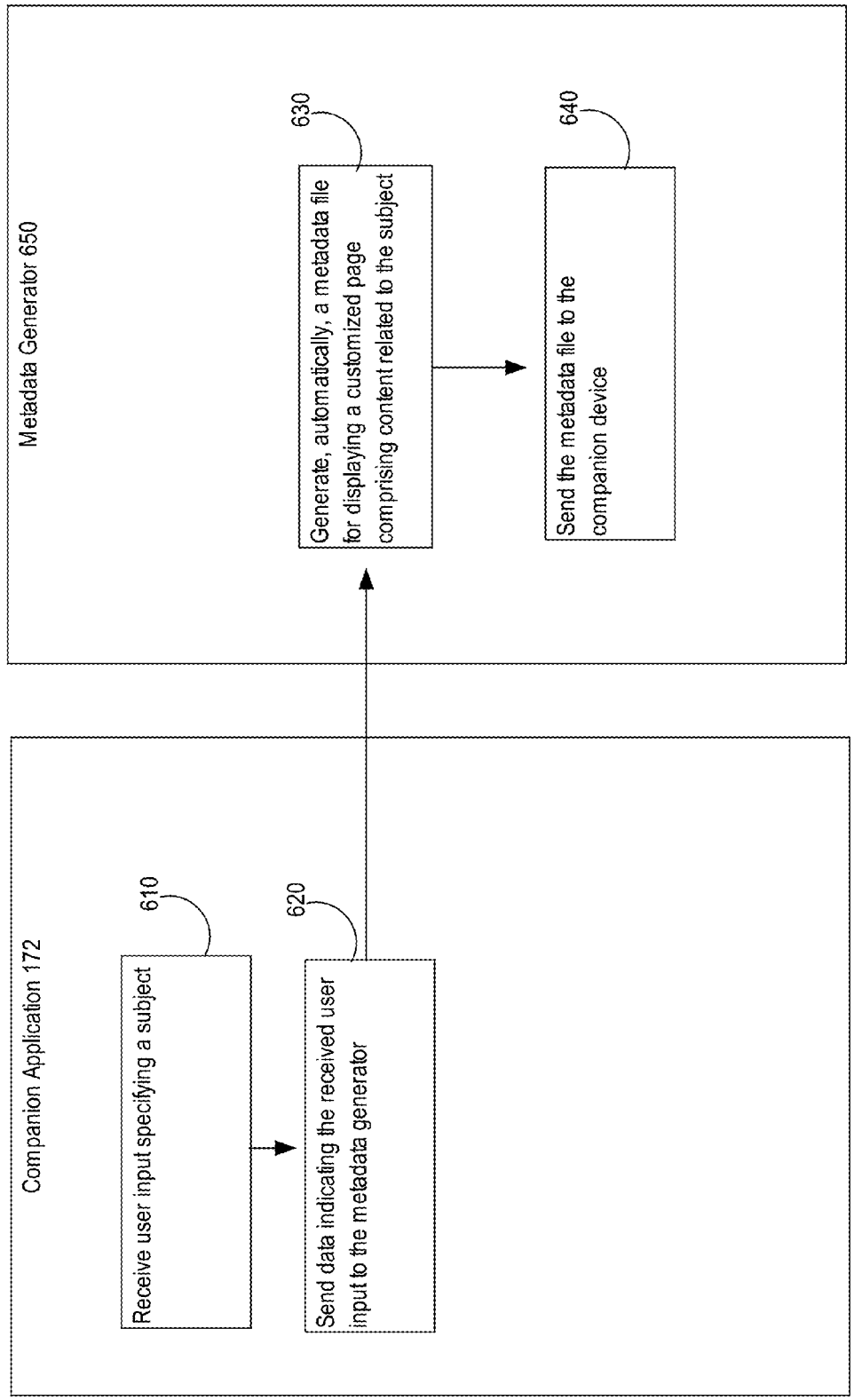
FIG. 6 represents an example process for automatically generating a metadata file based on user input.

In an embodiment, a metadata generator automatically generates metadata files. FIG. 6 represents an example process for automatically generating a metadata file based on user input. At block 610, companion application 172 receives a user input specifying a subject. The user may specify a subject such as "Angelina Jolie." At block 620, companion application 172 sends data identifying the received user input to metadata generator 650. The user may specify a subject by providing keywords or the user may be presented with a list of options and the user may specify a subject by selecting a particular option.

Metadata generator 650 comprises logic or program instructions that cause a metadata file to be generated. In an embodiment, the logic or instructions are Perl scripts. The logic or instructions of the metadata generator may be executed at file server 132 or elsewhere. At block 630, metadata generator 650 generates a metadata file for displaying a customized page comprising content related to the subject specified by the user input. The content of the metadata file is to be determined based on the received user input. For example, metadata generator 650 may generate a metadata file, which when interpreted by companion application 172, causes the display of an interface that includes web content and other media items related to the topic "Angelina Jolie." The instructions of metadata generator 650 may produce similar metadata files regardless of user input, but where the particular content is determined based on the user input. For example, the instructions of metadata generator 650 may generate a metadata file which causes a uniform layout to be produced each time, regardless of input, where the bottom half contains images and the top half contains news items and video, but the actual image, news, and video content is determined based on the received user input. The instructions of the metadata generator may create metadata, which when interpreted executes a particular query, and the particular query may include the key words "Angelina Jolie." Such a metadata file may be created in response to the user inputting the key words "Angelina Jolie."

Embodiments may integrate the use of metadata in many ways, of which the following are examples. In an embodiment, the companion device may retrieve weather forecast data; if the weather forecast data indicate that rainfall is occurring at a location of interest, then the computer may locate, select and play a video about rain. Alternatively, if the weather forecast data indicates cold temperatures at the location of the player or user, then the computer could locate, select and present a video about snow or in which snow is a theme. The metadata also may indicate the user's geographic location, and the player or computer may use the geo-location data to ensure that the videos are selected to be contextually relevant. For example, the computer or player may select and cause playing one or more videos from open sources, such as YouTube, that relate to, were taken near, or are about the location indicated in the geo-location data. Videos could be constrained to a particular locale such as within a 3 to 4 block radius of the player's then current location at the time of playback. To support this function, the player may use the YouTube API or similar access mechanisms to search for videos based on the geo-location data, based on matching to geo-location data that the author of a video provided to YouTube at the time that the video was taken.

Further, in an embodiment, the player may combine geo-location data for the companion device on which the player is running with social graph data. For example, the companion device may retrieve, from the social graph based on credentials for the user of the companion device, data about other social network friends or users of the companion device who are in the nearby geographic area and who are using the same app. The companion device may then launch a map within the video experience to show the user where other people who are using the app are located. The regions of the map may be constrained to a particular geographic area, for example, within a 10 to 20 block radius of the companion device. Social network friends of the user of the companion device may be indicated in the map using thumbnail images obtained via the social graph. In some embodiments, the companion device may show images of other users of the same social-enabled video app, who are not friends in the social graph of the current user; thus, the map could show thumbnail images of complete strangers who are nearby and using the same app. Consequently, the map can become part of the user's video experience. In this example, however, the social network data is not used to select videos.

In an embodiment, the social graph data may be used to display images or data about other social network friends who are online. For example, the companion device may display a popup window showing your actual Facebook friends who are online.

In an embodiment, social network data from the social graph may be combined with geo-location data indicating the geographic location of the companion device and used in the selection of videos. For example, such an embodiment may be configured to select and display one or more videos that have been posted to a video storage site from the local area recently by your social network friends or other users of the same social-enabled companion device app who have posted videos from the local geographic area.

In an embodiment, the application execution mechanisms of social networking sites may be used to create apps that interact with companion devices and the player disclosed herein. For example, a Facebook application may be configured to receive registration data for a social networking user who can then one of a specified maximum number of videos. During the video playback, the user can comment on the video. Selecting a map icon in the app may provide a display of other users in the vicinity. Alternatively, an app may implement an interactive video game in which a video is shown, and social networking friends of the user can enter a vote (e.g., thumbs up or thumbs down) on the video; votes determine whether the video keeps playing or another video is launched.

At block 640, metadata generator 650 sends the metadata file to the companion device, where companion application 172 can interpret the metadata and cause the operations defined in the metadata to occur. In another embodiment, metadata generator 650 may store the metadata file at some other location and companion application 172 may retrieve the metadata file from the other location.

In an embodiment, the metadata generator generates metadata that causes annotations to appear, which when clicked cause a new metadata file to be generated. For example, metadata generator 650 may send companion application 172 a metadata file for displaying a customized "Angelina Jolie" page comprising links to web videos, news articles, and photographs. By clicking on a photograph of Brad Pitt displayed in the customized "Angelina Jolie" page, a user may cause a new metadata file to be generated, which would cause the appearance of a customized "Brad Pitt" page. The metadata of the "Angelina Jolie" page may define an operation associated with a particular annotation, such that when the user selects the annotation, companion application 172 sends a request to metadata generator 650 for a new metadata file. The request may identify the particular annotation which was clicked or may simply provide the key words "Brad Pitt." In response to receiving the request, metadata generator 650 would generate or load a metadata file which can cause the display of a customized "Brad Pitt" page.

Figure 7:
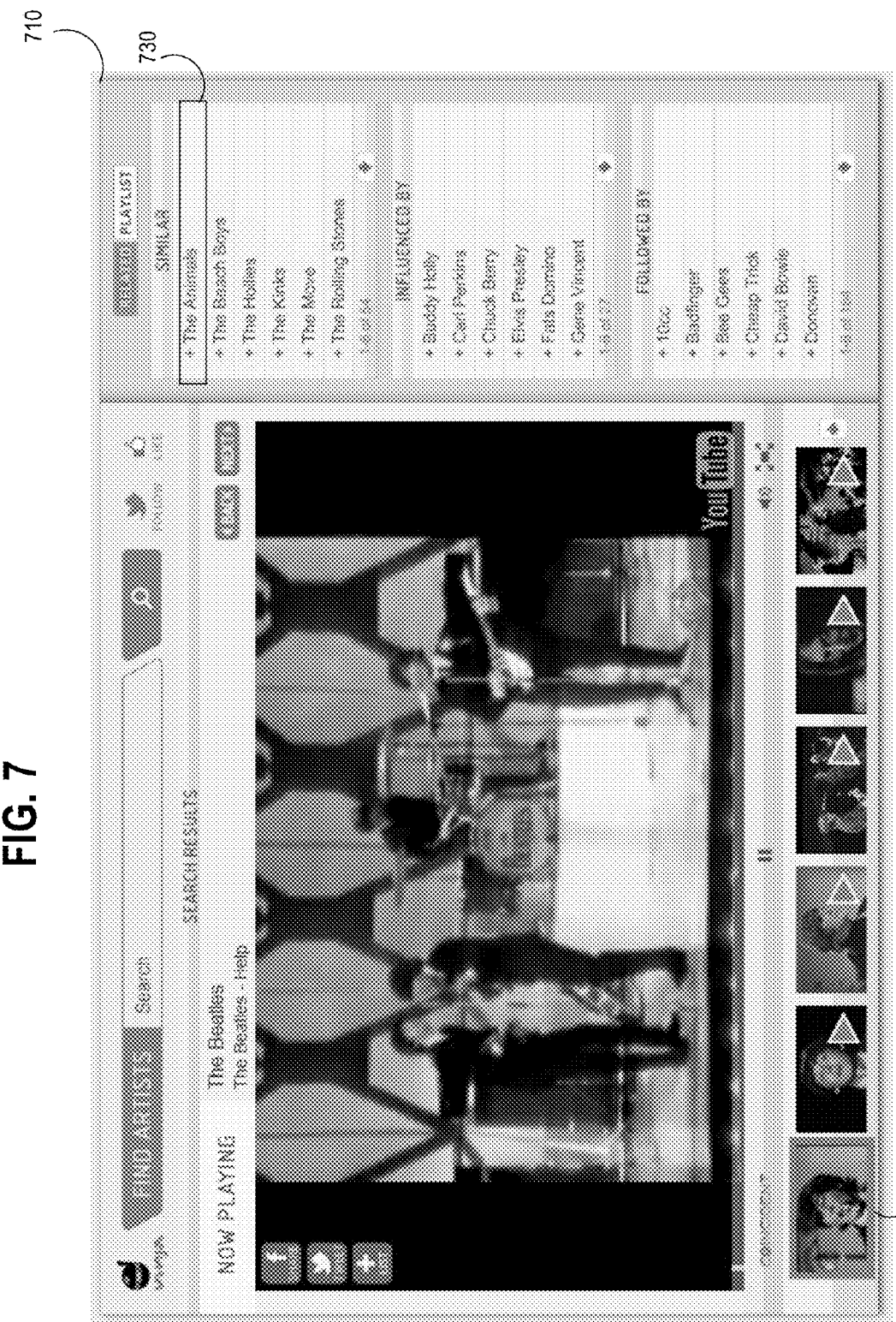
FIG. 7 illustrates an example content compilation which is caused to be displayed by an automatically generated metadata file.

FIG. 7 illustrates an example content compilation which is caused to be displayed by an automatically generated metadata file. Content compilation 710 displays, at the bottom of the screen, images of web videos, and at the right, a list of related artists. The images of web videos may be clicked to cause the display of the selected web video. Border 720 may border a particular web video that is playing, and the selection of a particular web video may cause an update to a filter key value. The display of the blue border may be controlled by a switched annotation where the particular video that is bordered is determined based on the value of the filter key.

The content compilation features a compilation of content related to the Beatles. The metadata which causes content compilation 710 to be displayed may have been generated by a metadata generator. The metadata generator may have generated the metadata in response receiving a user request for metadata which identified the Beatles. The particular videos and particular artists that are displayed are selected based on the user input identifying the Beatles.

The list of related artists may represent annotations that are associated with requests for metadata, including annotation 330. Annotation 730 is a graphic associated with a metadata request operation. The metadata which cause content compilation 710 to display defines a metadata request operation which occurs when annotation 730 is selected. The operation sends a request to a metadata generator for a new metadata file related to the Animals. Thus, when a user clicks on annotation 730, companion application 172 sends a request to the metadata generator, the metadata generator automatically generates a new metadata file, and a new metadata file is received. Companion application 172 then interprets the new metadata file, and the interpretation causes a new content compilation related to the Animals to be displayed. The automatically generated metadata file may cause content to be displayed on either display device 110 or companion application 172. The automatically generated metadata file may cause occurrence of any of the operations described above.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
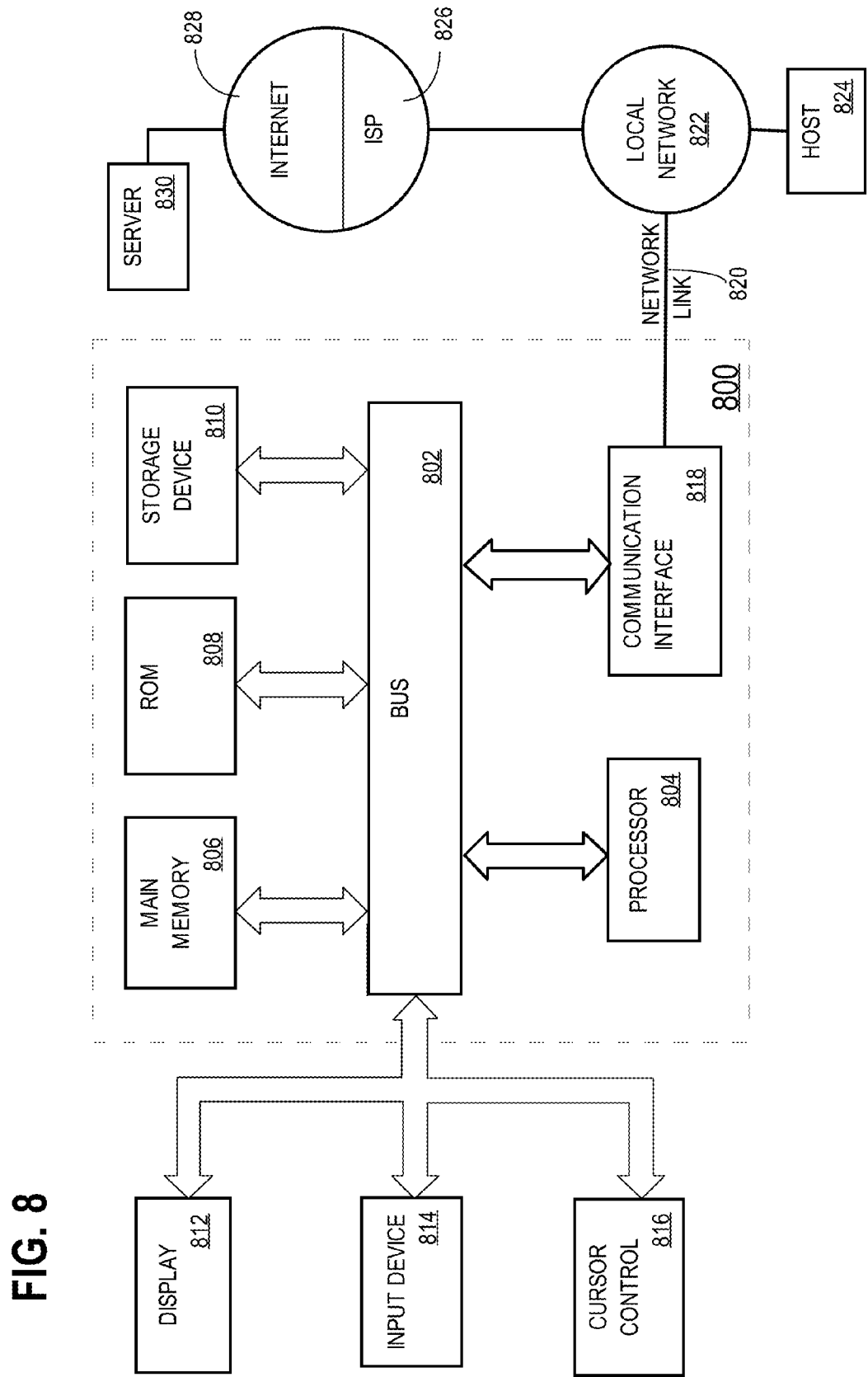
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 88, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 88. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    determining, at a companion device separate from a television, a current time point of a video program playing at the television, wherein the current time point of the video program is a time point currently being displayed at the television;
    identifying, based on said determination of the current time point of the video program and based on metadata defining a cue point associated with the determined current time point and an operation associated with the cue point, a particular operation to be performed;
    performing, at the companion device, the particular operation;
    wherein the particular operation is to cause a display of supplemental content at the television;
    determining that the supplemental content has concluded replaying;
    in response to said determination that the supplemental content has concluded replaying, sending instructions to a set top box associated with the television, a video server containing the video program, or the television to resume replaying the video program at a resume time point of the video program;
    wherein the method is performed by one or more computing devices.

2. The method of claim 1, wherein the companion device is a tablet computer, mobile computing device, smartphone, personal computer, laptop computer, or netbook computer.

3. The method of claim 1, wherein said determination of the current time point of the video program comprises:
    sending a request for content identification information to: the set top box associated with the television, the video server containing the video program, or the television;
    receiving content identification information identifying the video program being displayed and an initial time point of the video program, wherein the initial time point of the video program is a time point of the video program displaying at a time the content identification information was received;
    determining, based on the initial time point of the video program, the current time point of the video program.

4. The method of claim 1, wherein said determination of the current time point of the video program comprises adding a calculated amount of time to a particular time point, wherein the particular time point is a time point specified in an instruction to display the video program and the calculated amount of time is an amount of time passed since a time at which the video program began displaying.

5. The method of claim 1, wherein the supplemental content determined based on the metadata.

6. The method of claim 1, wherein said performance of the particular operation comprises sending instructions to the set top box associated with the television, the video server containing the supplemental content, or the television to display supplemental content at the television.

7. The method of claim 6, wherein said instructions indicate that the supplemental content is to be displayed concurrently with the video program.

8. The method of claim 6, wherein said instructions indicate that supplemental content is to be overlaid upon the video program during display.

9. The method of claim 1, wherein the video program is live content and a portion of the video program is buffered in the set top box associated with the television.

10. The method of claim 1, wherein the video program is live content and the metadata is periodically updated.

11. The method of claim 1, wherein the associated operation is to display one or more graphics, a second video, or an online electronic document.

12. The method of claim 11, wherein the particular operation is to display a graphic image, and the graphic image represents an annotation, and the method further comprises:
    receiving a selection of the annotation;
    in response to determining that the annotation has been selected, performing a certain operation associated with the annotation.

13. A non-transitory computer-readable data storage medium storing instructions which, when executed by one or more processors, cause the one or more processors to perform:
    determining, at a companion device separate from a television, a current time point of a video program playing at the television, wherein the current time point of the video program is a time point currently being displayed at the television;
    identifying, based on said determination of the current time point of the video program and based on metadata defining a cue point associated with the determined current time point and an operation associated with the cue point, a particular operation to be performed;
    performing, at the companion device, the particular operation;
    wherein the particular operation is to cause a display of supplemental content at the television;
    determining that the supplemental content has concluded replaying;
    in response to said determination that the supplemental content has concluded replaying, sending instructions to a set top box associated with the television, a video server containing the video program, or the television to resume replaying the video program at a resume time point of the video program.

14. The non-transitory computer-readable data storage medium of claim 13, wherein the companion device is a tablet computer, mobile computing device, smartphone, personal computer, laptop computer, or netbook computer.

15. The non-transitory computer-readable data storage medium of claim 13, wherein said determination of the current time point of the video program comprises:
    sending a request for content identification information to: the set top box associated with the television, the video server containing the video program, or the television;

receiving content identification information identifying the video program being displayed and an initial time point of the video program, wherein the initial time point of the video program is a time point of the video program displaying at a time the content identification information was received;

determining, based on the initial time point of the video program, the current time point of the video program.

16. The non-transitory computer-readable data storage medium of claim 13, wherein said determination of the current time point of the video program comprises adding a calculated amount of time to a particular time point, wherein the particular time point is a time point specified in an instruction to display the video program and the calculated amount of time is an amount of time passed since a time at which the video program began displaying.

17. The non-transitory computer-readable data storage medium of claim 13, wherein the supplemental content is determined based on the metadata.

18. The non-transitory computer-readable data storage medium of claim 13, wherein said performance of the particular operation comprises sending instructions to the set top box associated with the television, the video server containing the supplemental content, or the television to display supplemental content at the television.

19. The non-transitory computer-readable data storage medium of claim 18, wherein said instructions indicate that the supplemental content is to be displayed concurrently with the video program.

20. The non-transitory computer-readable data storage medium of claim 18, wherein said instructions indicate that supplemental content is to be overlaid upon the video program during display.

21. The non-transitory computer-readable data storage medium of claim 13, wherein the video program is live content and a portion of the video program is buffered in the set top box associated with the television.

22. The non-transitory computer-readable data storage medium of claim 13, wherein the video program is live content and the metadata is periodically updated.

23. The non-transitory computer-readable data storage medium of claim 13, wherein the associated operation is to display one or more graphics, a second video, or an online electronic document.

24. The non-transitory computer-readable data storage medium of claim 23, wherein the particular operation is to display a graphic image and the graphic image represents an annotation, and the instructions which, when executed by one or more processors, further cause the one or more processors to perform:

receiving a selection of the annotation;

in response to determining that the annotation has been selected, performing a certain operation associated with the annotation.

* * * * *